US012696146B2

(12) United States Patent
Li et al.

(10) Patent No.: US 12,696,146 B2
(45) Date of Patent: Jul. 28, 2026

(54) CELL HANDOVER METHOD AND APPARATUS, AND TERMINAL, BASE STATION AND STORAGE MEDIUM

(71) Applicant: Datang Mobile Communications Equipment Co., Ltd., Beijing (CN)

(72) Inventors: Hui Li, Beijing (CN); Runhua Chen, Beijing (CN); Qiubin Gao, Beijing (CN); Yajuan Luo, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 392 days.

(21) Appl. No.: 18/250,216

(22) PCT Filed: Oct. 19, 2021

(86) PCT No.: PCT/CN2021/124701
§ 371 (c)(1),
(2) Date: Apr. 23, 2023

(87) PCT Pub. No.: WO2022/083583
PCT Pub. Date: Apr. 28, 2022

(65) Prior Publication Data
US 2023/0422109 A1 Dec. 28, 2023

(30) Foreign Application Priority Data

Oct. 22, 2020 (CN) .......................... 202011140777.X
Jan. 18, 2021 (CN) .......................... 202110061672.3

(51) Int. Cl.
*H04W 36/00* (2009.01)
*H04L 5/00* (2006.01)

(52) U.S. Cl.
CPC ....... *H04W 36/0061* (2013.01); *H04L 5/0051* (2013.01); *H04W 36/0072* (2013.01); *H04W 36/0085* (2018.08)

(58) Field of Classification Search
CPC ......... H04W 36/0061; H04W 36/0072; H04W 36/00835; H04W 36/36; H04W 36/0085;
(Continued)

(56) References Cited

U.S. PATENT DOCUMENTS

2015/0092768 A1* 4/2015 Ng ........................ H04W 48/16
370/350
2018/0368035 A1 12/2018 Huang et al.
(Continued)

FOREIGN PATENT DOCUMENTS

CN 102740385 A 10/2012
CN 102882612 A 1/2013
(Continued)

OTHER PUBLICATIONS

International Search Report and Written Opinion received in the corresponding International Application PCT/CN2021/124701, mailed Jan. 11, 2022.
(Continued)

*Primary Examiner* — Yemane Mesfin
*Assistant Examiner* — Salma Ayad
(74) *Attorney, Agent, or Firm* — KILPATRICK TOWNSEND & STOCKTON LLP

(57) ABSTRACT

Provided in the embodiments of the present disclosure are a cell handover method and apparatus, and a UE, a base station and a storage medium. The method includes performing cell measurement on all cells on the basis of channel state information reference signal (CSI-RS) resource sets corresponding to cells; and sending a measurement result of at least one cell among all the cells to a base station of a
(Continued)

Receiving a measurement result corresponding to one or more cells transmitted by a user equipment (UE), where the measurement result corresponding to one or more cells is obtained by performing, by the UE, one or more cell measurements on multiple cells based on multiple channel state information reference signal (CSI-RS) resource sets corresponding to the multiple cells — 210

Making a cell handover decision based on the measurement result corresponding to one or more cells — 220 current cell, and the base station of the current cell performs cell handover determination on the basis of the received measurement result of the at least one cell. By means of the method and apparatus, and the UE, the base station and the storage medium provided in the embodiments of the present disclosure.

19 Claims, 3 Drawing Sheets

(58) Field of Classification Search
   CPC .............. H04W 36/0058; H04W 36/08; H04L 5/0051; H04L 5/0048
   See application file for complete search history.

(56) References Cited

U.S. PATENT DOCUMENTS

| | | | | |
|---|---|---|---|---|
| 2019/0273583 A1* | 9/2019 | Ugurlu | ................. | H04W 36/04 |
| 2020/0022046 A1* | 1/2020 | Wang | ................... | H04W 76/27 |
| 2020/0037260 A1* | 1/2020 | Fu | ....................... | H04W 52/325 |
| 2020/0053607 A1 | 2/2020 | Ingale et al. | | |
| 2020/0187067 A1 | 6/2020 | Decarreau et al. | | |
| 2022/0029692 A1* | 1/2022 | Yang | ..................... | H04L 5/0094 |
| 2022/0046443 A1* | 2/2022 | Tang | ..................... | H04W 24/10 |
| 2022/0167301 A1* | 5/2022 | Goyal | .................. | G01S 5/0236 |
| 2022/0377589 A1* | 11/2022 | Hashimoto | .......... | H04B 7/0695 |
| 2022/0393957 A1* | 12/2022 | Wang | ................. | H04L 43/0864 |
| 2023/0283426 A1* | 9/2023 | Liu | ....................... | H04L 5/0035 |
| | | | | 370/329 |

FOREIGN PATENT DOCUMENTS

| | | |
|---|---|---|
| CN | 103096368 A | 5/2013 |
| CN | 107135055 A | 9/2017 |
| CN | 108112034 A | 6/2018 |
| CN | 108882293 A | 11/2018 |
| CN | 110958097 A | 4/2020 |
| CN | 111262608 A | 6/2020 |
| EP | 2779739 A1 | 9/2014 |
| WO | 2016010468 A1 | 1/2016 |
| WO | 2020027601 A1 | 2/2020 |

OTHER PUBLICATIONS

First Office Action received in the priority Chinese Application 2021100616723, mailed Jan. 4, 2023.

First Search Report received in the priority Chinese Application CN2021100616723.

Office Action of Corresponding EP Patent Application No. 21881999.3 Dated Mar. 19, 2024.

The office action received in the counterpart European Application 21881999.3, mailed on May 22, 2026.

Sony, "Considerations on the enhancement of multi-beam operation", 3GPP TSG RAN WG1#102e, E-meeting, Aug. 17-28, 2020, total 10 pages, R1-2005560.

* cited by examiner

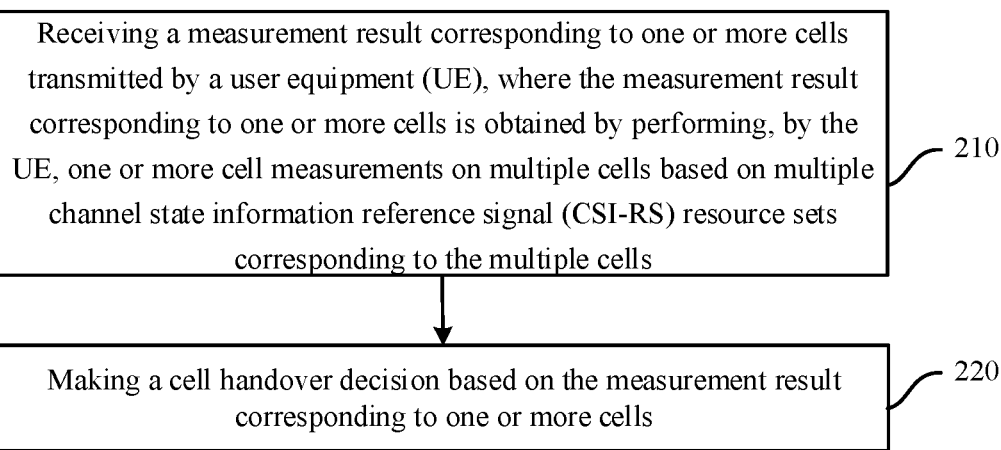

Receiving a measurement result corresponding to one or more cells transmitted by a user equipment (UE), where the measurement result corresponding to one or more cells is obtained by performing, by the UE, one or more cell measurements on multiple cells based on multiple channel state information reference signal (CSI-RS) resource sets corresponding to the multiple cells ⟋— 210

Making a cell handover decision based on the measurement result corresponding to one or more cells ⟋— 220

FIG. 3

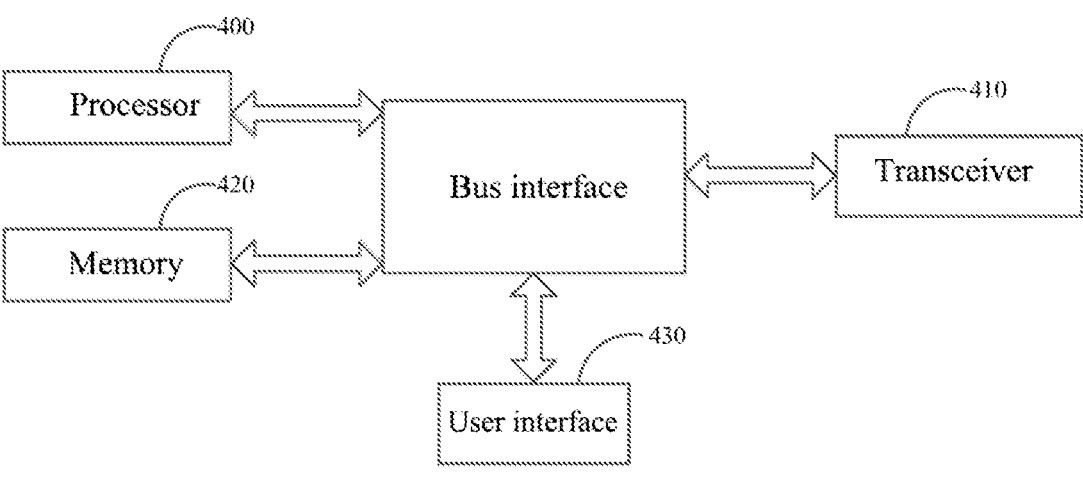

FIG. 4

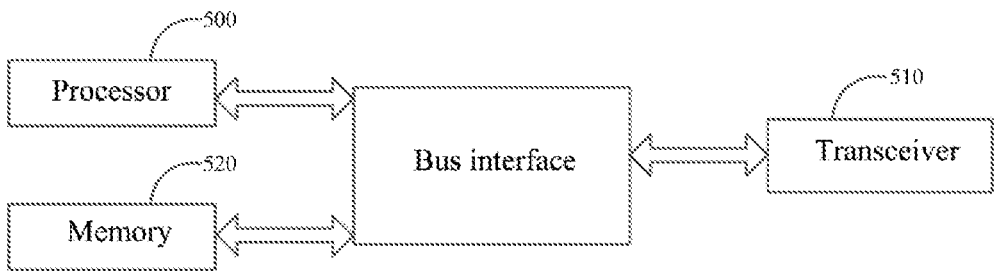

FIG. 5

CELL HANDOVER METHOD AND APPARATUS, AND TERMINAL, BASE STATION AND STORAGE MEDIUM

CROSS-REFERENCE TO RELATED APPLICATIONS

The present application is a national stage of International Application No. PCT/CN2021/124701, filed Oct. 19, 2021, which claims priority to Chinese patent application No. 202011140777X filed on Oct. 22, 2020, entitled "Cell Handover Method and Apparatus, and Terminal, Base Station and Storage Medium" and Chinese patent application No. 2021100616723 filed on Jan. 18, 2021, entitled "Cell Handover Method and Apparatus, and Terminal, Base Station and Storage Medium", which are hereby incorporated by reference in their entireties.

FIELD

The present application relates to the field of radio communication, and in particular, to methods and apparatuses for cell handover, a user equipment (UE), a base station and a storage medium.

BACKGROUND

In a mobile communication system, in case that a user equipment (UE) in communication moves from a cell to another cell, or a link quality of a serving cell deteriorates, in order to ensure a continuity of communication, the UE needs to handover to another cell through a network, and then another cell continues to provide services for the UE, that is, cell handover is executed.

At present, a cell handover executed in a new radio (NR) system has a large delay. For a moving UE in high speed, a cell handover delay may reduce a data transmission quality, resulting in a reliability of links not being guaranteed.

SUMMARY

Embodiments of the present application provide methods and apparatuses for cell handover, a user equipment (UE), a base station and a storage medium, which solve a problem of large cell handover delay.

An embodiment of the present application provides a method for cell handover, including:

performing cell measurement on multiple cells based on multiple channel state information reference signal (CSI-RS) resource sets corresponding to the multiple cells; and transmitting a measurement result corresponding to one or more cells among the multiple cells to a base station of a current cell, where the measurement result of one or more cells is used for making a cell handover decision for the base station of the current cell.

In an embodiment, each CSI-RS resource set corresponds to one cell, and the multiple CSI-RS resource sets are associated with one CSI reporting configuration; or each CSI-RS resource set corresponds to one cell, each CSI-RS resource set is associated with one CSI reporting configuration, and one or more CSI reporting configurations correspond to one CSI reporting state; or each CSI-RS resource in the CSI-RS resource set corresponds to one cell, and each CSI-RS resource set is associated with one CSI reporting configuration.

In an embodiment, the performing cell measurement on multiple cells based on CSI-RS resource sets corresponding to the multiple cells includes:

performing, based on an indicator in the CSI reporting configuration, at least one of layer 1 reference signal receiving power (L1-RSRP) measurement, spatial-filtered L1-RSRP measurement, layer 3 reference signal receiving power (L3-RSRP) measurement, or spatial-filtered L3-RSRP measurement on CSI-RS resource sets corresponding to each CSI reporting configuration.

In an embodiment, the performing L1-RSRP measurement on CSI-RS resource sets corresponding to each CSI reporting configuration includes:

performing the L1-RSRP measurement on each CSI-RS resource among the CSI-RS resource sets corresponding to each CSI reporting configuration, to obtain an L1-RSRP measurement value for each CSI-RS resource; and determining a measurement result corresponding to each CSI reporting configuration based on the L1-RSRP measurement value for each CSI-RS resource.

In an embodiment, the performing spatial-filtered L1-RSRP measurement on CSI-RS resource sets corresponding to each CSI reporting configuration includes:

performing the L1-RSRP measurement on each CSI-RS resource among the CSI-RS resource sets corresponding to each CSI reporting configuration, and averaging all L1-RSRP measurement results to obtain a measurement result corresponding to each CSI reporting configuration.

In an embodiment, the performing L3-RSRP measurement on CSI-RS resource sets corresponding to each CSI reporting configuration includes:

performing the L3-RSRP measurement on each CSI-RS resource among the CSI-RS resource sets corresponding to each CSI reporting configuration, to obtain an L3-RSRP measurement value for each CSI-RS resource; and determining a measurement result corresponding to each CSI reporting configuration based on the L3-RSRP measurement value for each CSI-RS resource.

In an embodiment, the performing spatial-filtered L3-RSRP measurement on CSI-RS resource sets corresponding to each CSI reporting configuration includes:

performing the L3-RSRP measurement on each CSI-RS resource among the CSI-RS resource sets corresponding to each CSI reporting configuration, and averaging all L3-RSRP measurement results to obtain a measurement result corresponding to each CSI reporting configuration.

In an embodiment, each CSI-RS resource set is configured with cell IDs corresponding to the one or more cells.

In an embodiment, the measurement result corresponding to one or more cells includes at least one of the following items: cell ID of the one or more cells, set indexes of CSI-RS resource sets corresponding to the one or more cells, an optimal measurement value and indexes of CSI-RS resources in the CSI-RS resource sets corresponding to the one or more cells, or precoding matrix indicators (PMIs) of the CSI-RS resource sets corresponding to the one or more cells.

In an embodiment, the transmitting the measurement result corresponding to one or more cells among the multiple cells to the base station of the current cell includes:

transmitting the measurement result corresponding to one or more cells among the multiple cells to the base station of the current cell based on a measurement result reporting configuration of the base station of the current cell and/or based on a predefined rule.

In an embodiment, the predefined rule includes that a neighbor cell has a measurement result better than a measurement result corresponding to the current cell, or the number of times that measurement result corresponding to any neighbor cell is better than the measurement result corresponding to the current cell is greater than a preset threshold.

In an embodiment, the transmitting the measurement result corresponding to one or more cells among the multiple cells to the base station of the current cell includes:

transmitting an optimal measurement result among measurement results of the multiple cells to the base station of the current cell.

In an embodiment, the transmitting the measurement result corresponding to one or more cells among the multiple cells to the base station of the current cell based on the predefined rule includes:

transmitting the measurement result corresponding to one or more cells to the base station of the current cell through a random access resource or an uplink resource request in case that the predefined rule is met.

In an embodiment, after the transmitting the measurement result corresponding to one or more cells among the multiple cells to the base station of the current cell, the method further includes:

transmitting a random access preamble sequence to a base station of a target cell to be handed over; and receiving random access response (RAR) message fed back based on the random access preamble sequence by the base station of the target cell.

In an embodiment, after the receiving RAR message fed back based on the random access preamble sequence by the base station of the target cell, the method further includes:

in case that the RAR message includes timing advance (TA) information, accessing the target cell based on the TA information in the RAR message; or determining TA information of the target cell from TA information of one or more cells pre-configured by the base station of the current cell, and accessing the target cell based on the TA information of the target cell.

In an embodiment, the transmitting the random access preamble sequence to the base station of the target cell to be handed over includes:

selecting, from CSI-RS resources in the CSI-RS resource sets corresponding to the target cell, a beam corresponding to a CSI-RS resource having an optimal measurement result as a preamble sequence transmission beam, and transmitting the random access preamble sequence to the base station of the target cell based on the preamble sequence transmission beam. In an embodiment, the method further includes:

receiving TA information or TA adjustment information transmitted by the base station of the current cell, where the TA information and the TA adjustment information are used for a user equipment (UE) to access a target cell.

An embodiment of the present application provides a method for cell handover, including:

receiving a measurement result corresponding to one or more cells transmitted by a user equipment (UE), where the measurement result corresponding to one or more cells is obtained by performing, by the UE, cell measurement on multiple cells based on CSI-RS resource sets corresponding to the multiple cells; and performing a cell handover decision based on the measurement result corresponding to one or more cells.

In an embodiment, each CSI-RS resource set corresponds to one cell, and the multiple CSI-RS resource sets are associated with one CSI reporting configuration; or each CSI-RS resource set corresponds to one cell, each CSI-RS resource set is associated with one CSI reporting configuration, and one or more CSI reporting configurations correspond to one CSI reporting state; or each CSI-RS resource in the CSI-RS resource set corresponds to one cell, and each CSI-RS resource set is associated with one CSI reporting configuration.

In an embodiment, before the receiving the measurement result corresponding to one or more cells transmitted by the UE, the method further includes:

transmitting resource set configuration information to the UE, where the resource set configuration information includes configuration information of CSI-RS resource sets, and configuration information of each CSI-RS resource set includes a cell ID of a corresponding cell, and the number of the CSI-RS resource sets is equal to the number of the cells.

In an embodiment, the measurement result corresponding to one or more cells includes at least one of the following items: cell ID of the one or more cells, set indexes of CSI-RS resource sets corresponding to the one or more cells, an optimal measurement value and indexes of CSI-RS resources in the CSI-RS resource sets corresponding to the one or more cells, or PMIs of one or more CSI-RS resource in the CSI-RS resource sets corresponding to the one or more cells.

In an embodiment, the optimal measurement value is an optimal value among all L1-RSRP measurement values for all CSI-RS resources of CSI-RS resource set.

In an embodiment, the measurement result corresponding to one or more cells is transmitted by the UE based on a measurement result reporting configuration of a base station of a current cell and/or based on a predefined rule.

In an embodiment, the predefined rule includes that a neighbor cell has a measurement result better than a measurement result corresponding to the current cell, or the number of times that measurement result corresponding to any neighbor cell is better than the measurement result corresponding to the current cell is greater than a preset threshold.

In an embodiment, the measurement result corresponding to one or more cells is an optimal measurement result among measurement results of the multiple cells.

In an embodiment, the measurement result corresponding to one or more cells is transmitted by the UE through a random access resource or an uplink resource request in case that the predefined rule is met.

In an embodiment, the method further includes:

transmitting TA information or TA adjustment information of one or more cells to the UE, where the TA information and the TA adjustment information are used for the UE to access a target cell.

An embodiment of the present application further provides a UE, including a processor, and a memory storing a computer program, where the computer program, when executed by the processor, causes the UE to performs the following operations:

performing cell measurement on multiple cells based on CSI-RS resource sets corresponding to the multiple cells; and transmitting a measurement result corresponding to one or more cells among the multiple cells to a base station of a current cell, where the measurement result of one or more cells is used for making a cell handover decision for the base station of the current cell.

An embodiment of the present application further provides a base station, including a processor, and a memory storing a computer program, where the computer program, when executed by the processor, causes the base station to performs the following operations:

receiving a measurement result corresponding to one or more cells transmitted by a UE, where the measurement result corresponding to one or more cells is obtained by performing, by the UE, cell measurement on multiple cells based on CSI-RS resource sets corresponding to the multiple cells; and performing a cell handover decision based on the measurement result corresponding to one or more cells.

An embodiment of the present application further provides an apparatus for cell handover, including:

a cell measurement device, used to perform cell measurement on multiple cells based on CSI-RS resource sets corresponding to the multiple cells; and a result transmitting device, used to transmit a measurement result corresponding to one or more cells among the multiple cells to a base station of a current cell, where the measurement result of one or more cells is used for making a cell handover decision for the base station of the current cell.

An embodiment of the present application further provides an apparatus for cell handover, including:

a result receiving device, used to receive a measurement result corresponding to one or more cells transmitted by a UE, where the measurement result corresponding to one or more cells is obtained by performing, by the UE, cell measurement on multiple cells based on CSI-RS resource sets corresponding to the multiple cells; and a handover decision device, used to perform a cell handover decision based on the measurement result corresponding to one or more cells.

An embodiment of the present application provides a non-transient computer-readable storage medium having a computer program stored thereon that causes a processor to perform the steps of the methods for cell handover described above.

In the methods and apparatuses for cell handover, the UE, the base station and the storage medium according to the embodiments of the present application, the UE may perform one or more cell measurements based on CSI-RS resource sets corresponding to each cell, and then transmit a measurement result to a base station of a current cell for cell handover decision. The cell measurement based on CSI-RS resource sets may be implemented only in layer 1 without introducing additional filters, which may avoid a delay caused by additional filtering operations and reduce a complexity of cell handover procedure, to improve a data transmission quality of the UE and ensuring a reliability of data transmission links.

BRIEF DESCRIPTION OF THE DRAWINGS

In order to clearly illustrate the solutions disclosed in the embodiments of the present application or the related art, the drawings used in the descriptions of the embodiments or the related art are briefly described below. The drawings in the following description are only some embodiments of the present application.

FIG. 3 is a schematic flowchart of a method for cell handover according to another embodiment of the present application;

FIG. 4 a schematic structural diagram of a user equipment (UE) according to an embodiment of the present application;

FIG. 5 a schematic structural diagram of a base station according to an embodiment of the present application;

DETAILED DESCRIPTION

The term "and/or" in embodiments of the present application describes an association relationship of associated objects, and indicates that there may be three kinds of relationships. For example, A and/or B, it may indicate three cases: A exists alone, A and B exist simultaneously, and B exists alone. The character "/" generally indicates that associated objects have an "or" relationship.

The term "multiple" in embodiments of the present application refers to two or more, and other quantifiers are similar.

In order to make the embodiments of the present application clearer, solutions in embodiments of the present application are described clearly and completely with reference to the drawings in the embodiments of the present application. These embodiments are only a part of the embodiments of the present application, and not all of the embodiments.

Figure 1:
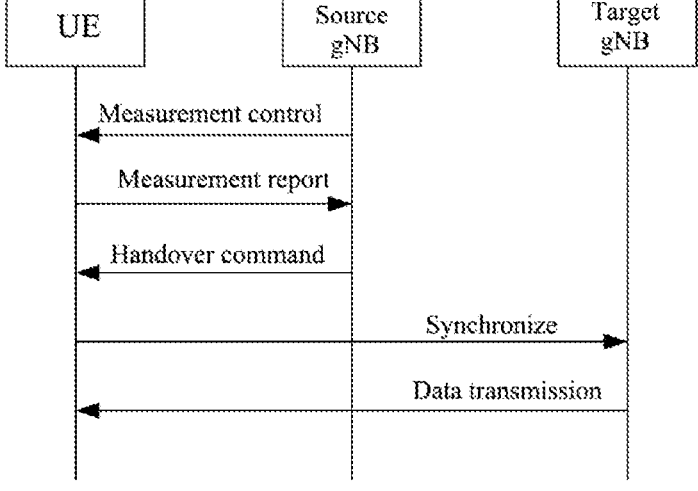
FIG. 1 is a schematic flowchart of a method for cell handover according to an embodiment of the present application.

FIG. 1 is a flowchart of a traditional method for cell handover. As shown in FIG. 1, in a new radio (NR) system, a traditional cell handover procedure includes the following steps:

step 1: a source base station (gNB) configures user equipment (UE) measurement procedure, where a measurement result from the UE is used to assist the source gNB in making a handover decision;

step 2: the UE reports the measurement result to the source gNB according to the measurement configuration;

step 3: the source gNB transmits a handover command to the UE, where the handover command carries radio resource control (RRC) reconfiguration information;

step 4: the UE receives the handover command and synchronizes to a target gNB, where the UE may access a target cell using a contention-based or contention-free random access procedure; and step 5: the target gNB transmits data to the UE.

In the step 1, the configuring user equipment (UE) measurement procedure by the source gNB mainly includes configuring the UE to measure a synchronization signal and physical broadcast channel (PBCH) block (SSB) of serving cell and a neighbor cell. In the step 2, the measurement result reported by the UE to the source gNB includes layer 3 reference signal receiving power (L3-RSRP), which is implemented by introducing an additional filter in the layer 3.

After receiving the measurement result, the source gNB makes the handover decision by comparing L3-RSRPs of layer 3. However, an additional filter is needed to filter multiple measurement results before L3-RSRP is reported, resulting in a large delay in cell handover. Especially for a moving UE in high speed, the above handover delay may reduce the quality of data transmission, and fails to guarantee a reliability of links.

Figure 2:
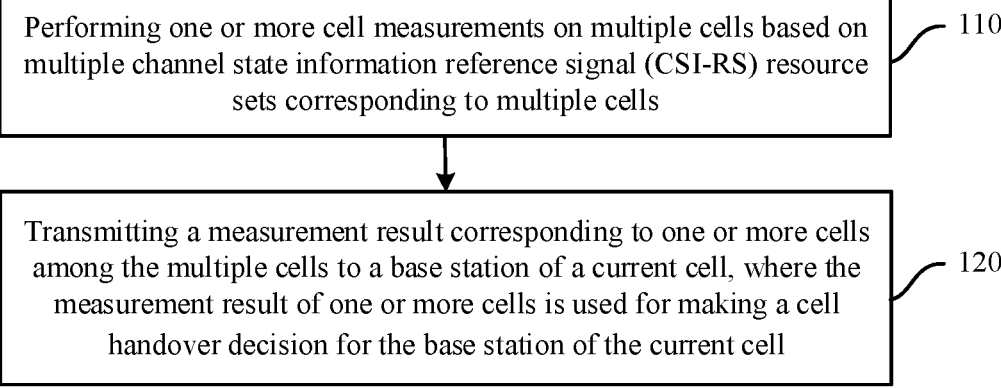
FIG. 2 is a schematic flowchart of a method for cell handover according to an embodiment of the present application.

An embodiment of the present application provides a method for cell handover. FIG. 2 is a schematic flowchart of a method for cell handover according to an embodiment of the present application. As shown in FIG. 2, an execution subject of this method is a user equipment (UE), and the method includes the following steps.

Step 110: performing cell measurement on multiple cells based on multiple channel state information reference signal (CSI-RS) resource sets corresponding to the multiple cells.

The multiple cells include a cell currently accessed by the UE, that is, a current cell, and a neighbor cell for the current cell. The number of the neighbor cell may be one or more.

The CSI-RS resource sets are sets of CSI-RS resources. Each CSI-RS resource set may include one or more CSI-RS resources.

Before the step 110 is executed, each cell may be configured with a CSI-RS resource set corresponding to each cell in advance, where the CSI-RS resource sets corresponding to the each cell may be configured to the UE by the base station of the current cell. Cells may be in one-to-one correspondence with CSI-RS resource sets, or each cell corresponds to multiple CSI-RS resource sets, or each CSI-RS resource set corresponds to multiple cells, which is not limited in the embodiments of the present application.

Based on the CSI-RS resource sets corresponding to each cell, the UE may perform cell measurement on each cell and obtain a measurement result for each cell. The measurement result for the cell may indicate a measurement result for the CSI-RS resource set corresponding to the cell. Compared with cell measurement method in which L3-RSRP is measured based on SSB, in the embodiment of the present application, each cell is configured with a CSI-RS resource set for performing one or more cell measurements, which may be implemented only in layer 1. For example, based on the CSI-RS resource set, measurement for layer 1 reference signal receiving power (L1-RSRP) or measurement for spatial-filtered L1-RSRP may be performed without a participation of layer 3, and further without introducing an additional filter in layer 3 for a filtering operation, which may avoid a delay caused by additional filtering operation in a traditional scheme and reduce a complexity of cell handover procedure.

Step 120: transmitting a measurement result corresponding to one or more cells among the multiple cells to a base station of a current cell, where the measurement result of one or more cells is used for making a cell handover decision for the base station of the current cell.

In an embodiment, after obtaining the measurement result corresponding to each cell among the multiple cells, that is, obtaining the measurement results of all cells, the UE may select measurement results of some cells from the measurement results of all cells and transmit them to the base station of the current cell, or directly transmit the measurement results of all cells to the base station of the current cell. The one or more cells in the step 120 may be one or more cells among all cells, or may be some cells with the optimal measurement results among all cells, or may be all neighbor cells having measurement results better than a measurement result corresponding to the current cell, or may be all cells with measurement results better than a preset threshold, or may be all cells, which is not limited in the embodiments of the present application.

In the step 120, the transmission operation of the UE may be configured by the base station of the current cell, or may be triggered by the UE autonomously. A condition for the UE autonomously to trigger the transmission operation may meet that a measurement result corresponding to a neighbor cell is better than the measurement result corresponding to the current cell, or there are neighbor cells having measurement results better than the measurement result corresponding to the current cell in consecutive cell measurements, etc., which is not limited in the embodiments of the present application.

After receiving the measurement result corresponding to one or more cells transmitted by the UE, the base station of the current cell may make a cell handover decision based on the measurement result corresponding to one or more cells. For example, in case that the measurement result corresponding to one or more cells includes measurement results of the neighbor cell and the current cell, if the measurement result corresponding to the neighbor cell is better than the measurement result corresponding to the current cell, the base station of the current cell transmits a handover command to the UE. For another example, in case that the measurement result corresponding to one or more cells only includes the measurement results of the cell with the optimal measurement results, the base station may determine whether to perform a cell handover based on the number of times that measurement results of a same cell are received.

In the method according to the embodiment of the present application, cell measurement may be performed based on CSI-RS resource sets corresponding to each cell, and then the measurement result may be transmitted to the base station of the current cell for making cell handover decision. The cell measurement based on CSI-RS resource set may be implemented only in layer 1 without the participation of layer 3, and further without introducing an additional filter in layer 3 for a filtering operation, which may avoid a delay caused by additional filtering operations and reduce a complexity of cell handover procedure, improves a data transmission quality of the UE and ensures a reliability of data transmission links.

Based on any of the above embodiments, each CSI-RS resource set corresponds to one cell, and the multiple CSI-RS resource sets are associated with one CSI reporting configuration.

The CSI-RS resource sets are in a one-to-one correspondence with the cells, and each cell is configured with one CSI-RS resources set corresponding to each cell, and then the UE may perform one or more cell measurements based on the CSI-RS resource sets corresponding to each cell, which facilitates a parallel cell measurement for multiple cells, and further shortens the time of the cell measurement and reduces the handover delay.

On above basis, the above multiple CSI-RS resource sets, that is, all CSI-RS resource sets, may be associated with the same CSI reporting configuration, to achieve a unified CSI reporting configuration for all CSI-RS resource sets. The referred CSI reporting configuration may include a reporting mechanism (such as periodic reporting, semi-persistent reporting or aperiodic reporting) of a CSI measurement result, and may further include information required for the reported measurement result. For example, the CSI reporting configuration may indicate that the UE periodically reports the optimal L1-RSRP measurement value corresponding to the optimal CSI-RS resource set and an index of the CSI-RS resource corresponding to optimal L1-RSRP measurement value, or indicate that the UE periodically reports the optimal L1-RSRP measurement value corresponding to the optimal CSI-RS resource set, an index of the CSI-RS resource corresponding to the optimal L1-RSRP measurement value and a cell ID corresponding to the optimal CSI-RS resource set. The referred optimal CSI-RS resource set is the CSI-RS resource set with the optimal measurement result among the above multiple CSI-RS resource sets.

Associating the multiple CSI-RS resource sets with the same CSI reporting configuration means that measurement results corresponding to the multiple CSI-RS resource sets need to be reported based on the information indicated by the same CSI reporting configuration. For example, in case that the reporting mechanism indicated in the CSI reporting configuration is periodic reporting, the measurement results corresponding to the multiple CSI-RS resource sets need to be reported periodically. For another example, in case that the CSI reporting configuration indicates that the reported measurement result needs to include the optimal L1-RSRP measurement value, the reported measurement results corresponding to the multiple CSI-RS resource sets need to include the optimal L1-RSRP measurement value.

For example, N CSI-RS resource sets are associated with one CSI reporting configuration. In this reporting configuration, the UE may be configured to periodically report the optimal L1-RSRP corresponding to each resource set and an index of CSI-RS resource corresponding to optimal L1-RSRP, and then, the UE reports N L1-RSRP measurement values and N indexes of CSI-RS resources each time. The CSI-RS resource set i is determined as an example, it includes M CSI-RS resources, where the seventh CSI-RS resource has the largest L1-RSRP measurement value, which is represented by $$RSRP_6^i,$$

and then $$RSRP_6^i$$

is reported, and the index of the seventh CSI-RS resource is reported simultaneously.

Based on any of the above embodiments, each CSI-RS resource set corresponds to a cell, each CSI-RS resource set is associated with the same CSI reporting configuration, and/or one or more CSI reporting configurations correspond to a CSI reporting state.

In an embodiment, the CSI-RS resource sets are in a one-to-one correspondence with the cells, and each cell is configured with one CSI-RS resources set corresponding to each cell, and then the UE may perform one or more cell measurements based on the CSI-RS resource sets corresponding to each cell, which facilitates a parallel cell measurement for multiple cells, and further shortens the time of the cell measurement and reducing the handover delay. On this basis, for the above multiple CSI-RS resource sets, that is, for the all CSI-RS resource sets, each CSI-RS resource set is associated with one CSI reporting configuration, and then different CSI-RS resource sets may correspond to the same or different CSI reporting configurations, which may improve a flexibility of CSI reporting.

The CSI reporting state is a superordinate concept of the CSI reporting configuration. By triggering the CSI reporting state, all the CSI reporting configurations corresponding to the CSI reporting state may be triggered. By establishing a correspondence between one or more CSI reporting configurations and one CSI reporting state, the CSI reporting configurations may be triggered synchronously. For example, N=2 CSI reporting states are configured, and CSI reporting state 1 is associated with M=3 CSI reporting configurations. Each reporting configuration is associated with one CSI-RS resource set, and is used for reporting corresponding measurement result. Since each CSI-RS resource set corresponds to one cell, CSI reporting state 1 may report the measurement results of M=3 cells. CSI reporting state 2 is associated with N=2 CSI reporting configurations. Each reporting configuration is associated with one CSI-RS resource set, which corresponds to one cell. In this way, CSI reporting state 2 may report measurement results of N=2 cells.

Each CSI-RS resource in each CSI-RS resource set corresponds to one cell, and each CSI-RS resource set is associated with one CSI reporting configuration.

In an embodiment, one CSI-RS resource set includes one or more CSI-RS resources. Each CSI-RS resource in each CSI-RS resource set corresponds to one cell, and different CSI-RS resources correspond to different cells. Through correspondences between CSI-RS resources and cells, the UE performs one or more cell measurements based on CSI-RS resources corresponding to each cell, which facilitates a parallel cell measurement of multiple cells, and further shortens the time of the cell measurement and reducing the handover delay.

On this basis, one CSI-RS resource set is associated with one CSI reporting configuration to achieve a unified CSI reporting configuration for all CSI-RS resources in the CSI-RS resource set.

Associating one CSI-RS resource set with one CSI reporting configuration means that measurement results corresponding to all CSI-RS resources among a CSI-RS resource set need to be reported based on the information indicated by the same CSI reporting configuration. For example, in case that a reporting mechanism indicated in the CSI reporting configuration is periodic reporting, the measurement results corresponding to all CSI-RS resources among a CSI-RS resource set need to be reported periodically.

Based on any of the above embodiments, the step 110 includes:

> performing, based on an indicator in the CSI reporting configuration, at least one of layer 1 reference signal receiving power (L1-RSRP) measurement, spatial-filtered L1-RSRP measurement, layer 3 reference signal receiving power (L3-RSRP) measurement, or spatial-filtered L3-RSRP measurement on CSI-RS resource sets corresponding to each CSI reporting configuration.

In case that the CSI-RS resource set is associated with the CSI reporting configuration in advance, for any CSI-RS reporting configuration, a CSI-RS resource set associated with the reporting configuration may be measured based on information included in a measurement result indicated in the reporting configuration, where the measurement modes may be any one or more (or a combination of two or more) of L1-RSRP measurement, spatial-filtered L1-RSRP measurement, L3-RSRP measurement, or spatial-filtered L3-RSRP measurement.

In case that the L1-RSRP measurement and/or the spatial-filtered L1-RSRP measurement are performed on CSI-RS resource sets corresponding to each CSI reporting configuration, and the L3-RSRP measurement and the spatial-filtered L3-RSRP measurement are not performed, the cell measurement is performed without a participation of layer 3, and further without introducing an additional filter in layer 3 for a filtering operation, which may avoid a delay caused by additional filtering operations in a traditional scheme and reduce a complexity of cell handover procedure. Based on any of the above embodiments, in the step 110, the performing at least one of L1-RSRP measurement, spatial-filtered L1-RSRP measurement, L3-RSRP measurement, or spatial-filtered L3-RSRP measurement on CSI-RS resource sets corresponding to each CSI reporting configuration includes:

performing at least two of the L1-RSRP measurement, the spatial-filtered L1-RSRP measurement, the L3-RSRP measurement or the spatial-filtered L3-RSRP measurement on each CSI-RS resource among the CSI-RS resource sets corresponding to each CSI reporting configuration, to obtain at least two of L1-RSRP measurement value, an average value of all L1-RSRP measurement values, L3-RSRP measurement value or an average value of all L3-RSRP measurement values for each CSI-RS resource, and determining the measurement result corresponding to each CSI reporting configuration based on that the at least two measurement values.

In case that multiple measurement modes are applied, measurement results of various measurement modes may be combined to determine the measurement result corresponding to the CSI reporting configuration.

Based on any of the above embodiments, in the step 110, the performing L1-RSRP measurement on CSI-RS resource sets corresponding to each CSI reporting configuration includes:

performing the L1-RSRP measurement on each CSI-RS resource among the CSI-RS resource sets corresponding to each CSI reporting configuration, to obtain an L1-RSRP measurement value for each CSI-RS resource; and determining a measurement result corresponding to each CSI reporting configuration based on the L1-RSRP measurement value for each CSI-RS resource.

In an embodiment, CSI-RS resource sets corresponding to each CSI reporting configuration may include one or more CSI-RS resources. When measurement is performed on CSI-RS resource sets corresponding to each CSI reporting configuration, L1-RSRP measurement may be performed on each CSI-RS resource among the CSI-RS resource sets corresponding to each CSI reporting configuration, to obtain an L1-RSRP measurement value for each CSI-RS resource among the CSI-RS resource sets corresponding to each CSI reporting configuration.

After the L1-RSRP measurement value for each CSI-RS resource among the CSI-RS resource sets corresponding to each CSI reporting configuration is obtained, the optimal L1-RSRP measurement value corresponding to each CSI-RS resource set may be selected, and determined as whole L1-RSRP measurement value for the corresponding CSI-RS resource set. The optimal L1-RSRP measurement value may be added to a measurement result corresponding to the CSI reporting configuration. An index of a CSI-RS resource corresponding to the optimal L1-RSRP measurement value may also be added to the measurement result corresponding to the CSI reporting configuration, which is not limited in the embodiments of the present application.

Based on any of the above embodiments, in the step 110, the performing spatial-filtered L1-RSRP measurement on CSI-RS resource sets corresponding to each CSI reporting configuration includes:

performing the L1-RSRP measurement on each CSI-RS resource among the CSI-RS resource sets corresponding to each CSI reporting configuration, and averaging all L1-RSRP measurement results to obtain a measurement result corresponding to CSI reporting configuration.

In an embodiment, CSI-RS resource sets corresponding to each CSI reporting configuration may include one or more CSI-RS resources. In case of performing measurement on CSI-RS resource sets corresponding to each CSI reporting configuration respectively, for any CSI reporting configuration, L1-RSRP measurement may be performed on each CSI-RS resource among the CSI-RS resource sets corresponding to the CSI reporting configuration, to obtain an L1-RSRP measurement value for each CSI-RS resource among the CSI-RS resource sets corresponding to the CSI reporting configuration. The L1-RSRP measurement values for all CSI-RS resources are averaged, and the average value is determined as the measurement result corresponding to the CSI reporting configuration.

Based on any of the above embodiments, the performing L3-RSRP measurement on CSI-RS resource sets corresponding to each CSI reporting configuration includes:

performing the L3-RSRP measurement on each CSI-RS resource among the CSI-RS resource sets corresponding to each CSI reporting configuration, to obtain an L3-RSRP measurement value for each CSI-RS resource; and determining a measurement result corresponding to each CSI reporting configuration based on the L3-RSRP measurement value for each CSI-RS resource.

In an embodiment, CSI-RS resource sets corresponding to each CSI reporting configuration may include one or more CSI-RS resources. In case of performing measurement on CSI-RS resource sets corresponding to each CSI reporting configuration respectively, L3-RSRP measurement may be performed on each CSI-RS resource among the CSI-RS resource sets corresponding to each CSI reporting configuration, to obtain an L3-RSRP measurement value for each CSI-RS resource among the CSI-RS resource sets corresponding to each CSI reporting configuration.

After obtaining the L3-RSRP measurement value for each CSI-RS resource among the CSI-RS resource sets corresponding to each CSI reporting configuration is obtained, the optimal L3-RSRP measurement value corresponding to each CSI-RS resource set may be selected, and determined as L3-RSRP measurement value for the whole CSI-RS resource set. The optimal L3-RSRP measurement value may be added to a measurement result corresponding to the CSI reporting configuration. An index of a CSI-RS resource corresponding to the optimal L3-RSRP measurement value may also be added to the measurement result corresponding to CSI reporting configuration, which is not limited in the embodiments of the present application.

Based on any of the above embodiments, in the step 110, the performing spatial-filtered L3-RSRP measurement on CSI-RS resource sets corresponding to each CSI reporting configuration includes:

performing the L3-RSRP measurement on each CSI-RS resource among the CSI-RS resource sets corresponding to each CSI reporting configuration, and averaging all L3-RSRP measurement results to obtain a measurement result corresponding to the CSI reporting configuration.

In an embodiment, CSI-RS resource sets corresponding to each CSI reporting configuration may include one or more CSI-RS resources. In case of performing measurement on CSI-RS resource sets corresponding to each CSI reporting configuration respectively, for any CSI reporting configuration, L3-RSRP measurement may be performed on each CSI-RS resource among the CSI-RS resource sets corresponding to the CSI reporting configuration, to obtain an L3-RSRP measurement value for each CSI-RS resource among the CSI-RS resource sets corresponding to the CSI reporting configuration. The L3-RSRP measurement values of all CSI-RS resources are averaged, and the average value is determined as the measurement result corresponding to the CSI reporting configuration.

Based on any of the above embodiments, in case that CSI-RS resource sets are in one-to-one correspondence with cells, the step 110 includes:

performing the L1-RSRP measurement on CSI-RS resource set corresponding to each cell.

In an embodiment, in case of performing cell measurement on any cell, the L1-RSRP measurement may be performed on the CSI-RS resource set corresponding to the cell, to obtain a L1-RSRP measurement value corresponding to the cell. The above operations may be performed on each cell, and L1-RSRP measurement values corresponding to all cells may be obtained. In the present embodiment, the RSRP measurement based on CSI-RS resource may be implemented at layer 1, without introducing an additional filter for filtering operations, thus reducing the cell handover delay.

Based on any of the above embodiments, the step 110 includes:

performing the L1-RSRP measurement on each CSI-RS resource among CSI-RS resource sets corresponding to each cell, to obtain an L1-RSRP measurement value for each CSI-RS resource in each CSI-RS resource set; and determining a measurement result corresponding to each cell based on the L1-RSRP measurement value for each CSI-RS resource in each CSI-RS resource set.

In an embodiment, CSI-RS resource sets corresponding to each cell may include one or more CSI-RS resources. In case of performing cell measurement on each cell respectively, L1-RSRP measurement may be performed on each CSI-RS resource among the CSI-RS resource sets corresponding to each cell, to obtain an L1-RSRP measurement value for each CSI-RS resource among the CSI-RS resource sets corresponding to each cell.

After the L1-RSRP measurement value for each CSI-RS resource among the CSI-RS resource sets corresponding to each cell is obtained, the optimal L1-RSRP measurement value corresponding to each CSI-RS resource set may be selected, and determined as L1-RSRP measurement value for the whole CSI-RS resource set. The optimal L1-RSRP measurement value may be added to a measurement result corresponding to a cell. A resource index of a CSI-RS resource corresponding to the optimal L1-RSRP measurement value may also be added to the measurement result corresponding to a cell, which is not limited in the embodiments of the present application.

Based on any of the above embodiments, each CSI-RS resource set is configured with cell IDs corresponding to the one or more cells.

In an embodiment, CSI-RS resource sets are in one-to-one correspondence with cells. Each CSI-RS resource set is configured with cell IDs used to identify the one or more cells. The UE may determine the one-to-one correspondence between CSI-RS resource sets and cells based on a cell ID configured in a CSI-RS resource set. In case of reporting the measurement result based on the CSI-RS resource set to the base station of the current cell, the UE may add the cell ID of the corresponding cell to the measurement result, and then the base station of the current cell may obtain the correspondence between the measurement result and the cell after receiving the measurement result, and determine whether to require execution of cell handover.

Based on any of the above embodiments, the measurement result corresponding to one or more cells includes at least one of the following items: cell ID of the one or more cells, set indexes of CSI-RS resource sets corresponding to the one or more cells, an optimal measurement value and resource indexes of CSI-RS resources in the CSI-RS resource sets corresponding to the one or more cells, or precoding matrix indicators (PMIs) of the CSI-RS resource sets corresponding to the one or more cells.

In an embodiment, before the UE transmits the measurement result corresponding to one or more cells to the base station, the UE may first determine the cell whose measurement result needs to be transmitted. Based on a CSI-RS resource set corresponding to the cell whose measurement result needs to be transmitted, CSI calculation is performed on the cell whose measurement result needs to be transmitted to obtain a PMI of the cell whose measurement result needs to be transmitted. Correspondingly, the measurement result corresponding to one or more cells may include the PMI of the CSI-RS resource set corresponding to the one or more cells.

For example, the base station of the current cell may configure N CSI-RS resource sets for the UE, and each CSI-RS resource set corresponds to one cell. The resource set i includes $M_i$ CSI-RS resources, where $i=0, 1, \ldots, N-1$, and N is greater than or equal to 1. Each CSI-RS resource set is configured with one cell ID for indicating that the corresponding CSI-RS resource set is transmitted by which cell. CSI-RS resources are transmitted periodically.

The UE performs L1-RSRP measurement on each CSI-RS resource in N CSI-RS resource sets. For CSI-RS resource set i, M L1-RSRP measurement values may be obtained, and the optimal measurement value among the M L1-RSRP measurement values is determined as an L1-RSRP measurement value for CSI-RS resource set i.

The UE compares the L1-RSRP measurement value corresponding to the current cell with the L1-RSRP measurement value corresponding to the neighbor cell. In case that the L1-RSRP measurement value corresponding to the neighbor cell is better than the L1-RSRP measurement value corresponding to the current cell, the L1-RSRP measurement value corresponding to the neighbor cell is reported to the base station of the current cell. The index of the CSI-RS resource corresponding to the L1-RSRP measurement value is simultaneously reported. In addition, the index of the CSI-RS resource set corresponding to this L1-RSRP measurement value or the cell ID corresponding to this L1-RSRP measurement value may also be reported to the base station of the current cell.

In the method according to the embodiment of the present application, CSI-RS resource sets configured for each cell may be used not only for cell measurement, but also for PMI measurement feedback. The PMI is fed back while feeding back the cell measurement result. Compared with a traditional scheme in which the PMI is fed back after determining to execute cell handover, in the embodiment of the present application, the PMI is fed back before determining to execute cell handover, which facilitates simplifying the cell handover procedure and reducing cell handover delay.

Based on any of the above embodiments, the step 120 includes:

transmitting the measurement result corresponding to one or more cells among all or the cells to the base station of the current cell based on a measurement result reporting configuration of the base station of the current cell and/or based on a predefined rule.

In an embodiment, there are three modes for the UE to transmit the measurement result corresponding to one or more cells to the base station of the current cell. One mode is to transmit the measurement results based on a measurement result reporting configuration pre-configured by the base station of the current cell. The referred measurement result reporting configuration may include the cell whose measurement result needs to be transmitted, a period of feeding back measurement result, and/or information included in the fed back measurement result, etc. For example, the measurement result reporting configuration may indicate the UE to periodically report the optimal L1-RSRP measurement value corresponding to each CSI-RS resource set and an index of the CSI-RS resource corresponding to the optimal L1-RSRP measurement value, or may indicate the UE to periodically report the optimal L1-RSRP measurement value corresponding to the optimal CSI-RS resource set and an index of the CSI-RS resource corresponding to the optimal L1-RSRP measurement value, as well as the cell ID corresponding to the optimal CSI-RS resource set. Another mode is that based on the predefined rule, the UE determines whether the measurement result obtained by performing the cell measurement satisfies the predefined rule, and then determines whether to feed back the cell measurement result. In addition, there may be another mode: the UE determines whether to feed back the cell measurement result by itself based on a measurement result reporting configuration pre-configured by the base station of the current cell in combination with predefined rule.

The pre-defined rule may be that there is a neighbor cell having a measurement result better than a measurement result corresponding to the current cell, or there is a neighbor cell having a measurement result better than a preset measurement threshold, or the measurement results of the current cell obtained by consecutive cell measurements are not reach a preset measurement threshold, etc., which is not limited in the embodiments of the present application.

For example, it is assumed that resource set 0 is the CSI-RS resource set transmitted by the base station of the current cell, and $M_0$ L1-RSRP measurement values may be obtained accordingly. The largest L1-RSRP measurement value is the RSRP corresponding to the third CSI-RS resource, which is represented as $$RSRP_2^0.$$

For the rest (N–1) CSI-RS resource sets, the largest L1-RSRP measurement value is the RSRP corresponding to the fifth CSI-RS resource in CSI-RS resource set 3, which is represented as $$RSRP_4^3$$

In case that $$RSRP_4^3 \leq RSRP_2^0,$$

it indicates that the quality of the current cell is the best, there is no need to handover, and the UE does not perform any reporting action. In case that $$RSRP_4^3 > RSRP_2^0,$$

it indicates that the quality of neighbor cell is better, and handover is recommended. The UE triggers cell handover reporting, and reports the index of CSI-RS resource set 3 corresponding to $$RSRP_4^3$$

and the index of the fifth CSI-RS resource in CSI-RS resource set 3.

In addition, in order to ensure stability, a preset threshold S may be predefined, where S is greater than 1. In case that the number of times that the RSRP of the neighbor cell exceeds the RSRP of the current cell is greater than the preset threshold S, the handover reporting of the UE is triggered.

Based on any of the above embodiments, the predefined rule includes that a neighbor cell has a measurement result better than a measurement result corresponding to the current cell, or the number of times that measurement result corresponding to any neighbor cell is better than the measurement result corresponding to the current cell is greater than a preset threshold.

In an embodiment, the pre-defined rule may be that there is a neighbor cell having a measurement result better than the measurement result corresponding to the current cell. In this case, if the UE is triggered to hand over from the current cell to the neighbor cell with better measurement result, link qualities may be optimized, therefore, handover is recommended. The UE may transmit the measurement result corresponding to the neighbor cell with better measurement result to the base station of the current cell.

Considering the stability of the link qualities, the pre-defined rule may be that the number of times that measurement result corresponding to any neighbor cell is better than the measurement result corresponding to the current cell is greater than a preset threshold, that is, there is a neighbor cell having a measurement result better than the measurement result corresponding to the current cell in consecutive cell measurements. In this case, if the UE is triggered to handover from the current cell to the neighbor cell with better measurement result, link qualities may be optimized, therefore, handover is recommended. The UE may transmit the measurement result corresponding to the neighbor cell with better measurement result to the base station of the current cell.

Based on any of the above embodiments, in the step 120, the transmitting the measurement result corresponding to one or more cells in all cells to the base station of the current cell includes transmitting an optimal measurement result among measurement results of all cells to the base station of the current cell.

In case of transmitting measurement result, a measurement result corresponding to only one cell, that is, the optimal measurement result among all measurement results of all cells, may be transmitted. For example, a set index of the CSI-RS resource set with the optimal measurement result may be transmitted, or a cell ID configured in the CSI-RS resource set with the optimal measurement result may be transmitted, or an optimal measurement value for each CSI-RS resource in the CSI-RS resource set with the optimal measurement result and a resource index of the CSI-RS resource corresponding to the optimal measurement value may be transmitted simultaneously, or a PMI of the CSI-RS resource with the optimal measurement result may also be transmitted together, which is not limited in the embodiments of the present application.

Based on any of the above embodiments, in the step 120, the transmitting the measurement result corresponding to one or more cells in all cells to the base station of the current cell based on predefined rules includes:

transmitting the measurement result corresponding to one or more cells to the base station of the current cell through a random access resource or an uplink resource request in case that the predefined rule is met.

In an embodiment, in case that the measurement result corresponding to each cell meets the predefined rule, the UE automatically triggers feedback of measurement result by itself. The feedback triggered by the UE itself may be fed back through random access resource, for example, feedback of measurement result is performed in the physical random access channel (PRACH) process. Feedback may also be performed through uplink resource request, for example, by using uplink resource request, the base station of the current cell allocates uplink resources for feedback of the measurement result, which is not limited in the embodiments of the present application.

Based on any of the above embodiments, after the step 120, the method further includes:

transmitting a random access preamble sequence to a base station of a target cell to be handed over; and receiving random access response (RAR) message fed back based on the random access preamble sequence by the base station of the target cell.

After the UE transmits the measurement result corresponding to one or more cells to the base station of the current cell, the base station of the current cell makes a cell handover decision based on the received measurement result. In case that the decision result is to perform cell handover, the base station of the current cell issues a cell handover command to the UE, and the cell handover command includes a target cell to be handed over.

After receiving the cell handover command, the UE may transmit a random access preamble sequence to the base station of the target cell to be handed over. The base station of the target cell returns a random access response (RAR) message after monitoring the preamble. The UE may receive RAR message on a physical downlink control channel (PDCCH) or physical downlink shared channel (PDSCH).

Generally, in an access process to the target cell, after receiving the RAR message, the UE needs to transmit an RRC request on a physical uplink shared channel (PUSCH), receive a contention resolution message returned by the base station of the target cell on the PDSCH, and upgrade a temporary cell-radio network temporary identity (TC-RNTI) to cell-radio network temporary identity (C-RNTI), and then the base station of the target cell configures channel measurement information for the UE, and after reporting CSI, the UE performs new data transmission.

In traditional scheme, the base station of the target cell needs to configure new channel measurement information for the UE, and new data transmission is started after feedback from the UE is obtained, which leads to large handover delay. In the embodiment of the present application, since the base station of the current cell has configured CSI-RS resource sets corresponding to each cell (which includes the CSI-RS resource sets corresponding to the target cell) for the UE in advance, the UE has been configured with the CSI-RS resource sets corresponding to the target cell in case of performing cell handover, and the base station of the target cell does not need to reconfigure channel measurement information, which simplifies the cell handover procedure and further reduces the cell handover delay.

In addition, in a traditional access process to the target cell, the UE needs to access the target cell through the aforementioned random access process, which is relatively complex and has a large delay. Based on any of the above embodiments, after the receiving RAR message fed back based on the random access preamble sequence by the base station of the target cell, the method further includes:

in case that the RAR message includes timing advance (TA) information, accessing the target cell based on the TA information in the RAR message; or determining TA information of the target cell from TA information of one or more cells pre-configured by the base station of the current cell, and accessing the target cell based on the TA information of the target cell.

In an embodiment, the RAR message includes TA information, but does not include uplink channel resource allocation information. The UE may access the target cell based on the TA information included in the RAR message.

In another implementation, the RAR message is only used for confirmation of random access, and it includes neither TA information nor uplink channel resource allocation information. The UE may select the TA information of the target cell from the TA information of multiple cells pre-configured by the base station of the current cell to the UE, and then access the target cell through the pre-configured TA information.

In the method according to the embodiment of the present application, during the access process to the target cell, the UE only needs to receive the RAR message to access the target cell, which simplifies the process of accessing the target cell and reduces the cell handover delay.

Based on any of the above embodiments, the transmitting the random access preamble sequence to the base station of the target cell to be handed over includes:

selecting, from CSI-RS resources in the CSI-RS resource sets corresponding to the target cell, a beam corresponding to a CSI-RS resource having an optimal measurement result as a preamble sequence transmission beam, and transmitting the random access preamble sequence to the base station of the target cell based on the preamble sequence transmission beam.

In the step 110, cell measurement has been performed on the target cell based on the CSI-RS resource set corresponding to the target cell, the L1-RSRP measurement value for each CSI-RS resource in the CSI-RS resource set corresponding to the target cell has been obtained, and the CSI-RS resource corresponding to the optimal L1-RSRP measurement value, that is, the best CSI-RS, has been determined.

In the cell handover procedure, the beam corresponding to the optimal CSI-RS may be used as a transmitting beam of random access preamble sequence for transmitting random access preamble sequence on a PRACH resource. In the embodiment of the present application, the beam corresponding to the optimal CSI-RS resource in the measurement result corresponding to the target cell is determined as a preamble sequence transmission beam, which may effectively ensure the success rate of random access.

Based on any of the above embodiments, the method further includes:

receiving TA information or TA adjustment information transmitted by the base station of the current cell, where the TA information and the TA adjustment information are used for a UE to access a target cell.

The base station of the current cell may transmit the TA information or TA adjustment information to the UE before or after determining to execute the cell handover. The transmitted TA information or TA adjustment information may correspond to each cell or only to the target cell, which is not limited in the embodiments of the present application.

The TA information or TA adjustment information transmitted by the base station of the current cell corresponding to each cell may be determined based on deployment of base station of each cell. For example, in a high-speed railway scenario, the TA information of each cell during handover may be determined based position relationships between tracks and multiple base stations.

In the case that the base station of the current cell has configured TA information of each cell to the UE in advance, the UE may do not perform the random access process when performing cell handover. In case of transmitting the cell handover command, the base station of the current cell may also configure an RRC parameter and/or other configuration information of the target cell to the UE. After obtaining the RRC parameter and/or other configuration information, the UE may perform data transmission with the target cell.

For example, the base station of the current cell may configure TA information of all cells including the current cell and each neighbor cell to the UE in the form shown below.

| PCI0 | PCI1 | . . . | PCIN-2 | PCIN-1 |
| TA0  | TA1  | . . . | TAN-2  | TAN-1  |

A physical cell identifier (PCI) is used to distinguish different cells. Each cell corresponds to a TA.

An embodiment of the present application provides a method for cell handover. FIG. 3 is a schematic flowchart of a method for cell handover according to another embodiment of the present application. As shown in FIG. 3, an execution subject of this method is a base station, and the method includes the following steps.

Step 210: receiving a measurement result corresponding to one or more cells transmitted by a user equipment (UE), where the measurement result corresponding to one or more cells is obtained by performing, by the UE, cell measurement on multiple cells based on multiple channel state information reference signal (CSI-RS) resource sets corresponding to the multiple cells.

The multiple cells include a cell currently accessed by the UE, that is, a current cell, and a neighbor cell of the current cell. The number of the neighbor cells may be one or more.

A CSI-RS resource set is a set of CSI-RS resources. Each CSI-RS resource set may include one or more CSI-RS resources.

Before the step 210 is executed, each cell may be configured with a corresponding CSI-RS resource set in advance, where the CSI-RS resource sets corresponding to each cell may be configured to the UE by the base station of the current cell. Correspondences between cells and CSI-RS resource sets may be one-to-one correspondence, or each cell corresponding to multiple CSI-RS resource sets, or each CSI-RS resource set corresponding to multiple cells, which is not limited in the embodiments of the present application.

Based on the corresponding CSI-RS resource sets of each cell, the UE may perform cell measurement on each cell and obtain a measurement result for each cell. The measurement result for the cell may indicate a measurement result for the corresponding CSI-RS resource set of the cell. Compared with cell measurement method which measures L3-RSRP based on SSB, in the embodiment of the present application, each cell is configured with a CSI-RS resource set for cell measurement, which may be implemented only in layer 1. For example, based on the CSI-RS resource set, measurement for L1-RSRP or measurement for spatial-filtered L1-RSRP may be performed without a participation of layer 3, and further without introducing an additional filter in layer 3 for a filtering operation, which may avoid a delay caused by additional filtering operation in a traditional scheme and reduce a complexity of cell handover procedure.

In an embodiment, after obtaining the measurement results of the above multiple cells, that is, measurement results of all cells, the UE may select measurement results of some cells from the measurement results of all cells and transmit them to the base station of the current cell, or directly transmit the measurement results of all cells to the base station of the current cell. Accordingly, the base station of the current cell may receive the measurement results of some cells transmitted by the UE, or may receive the measurement results of all cells transmitted by the UE. The one or more cells in the embodiment of the present application may be one or more cells among all cells, or may be some cells with the optimal measurement results among all cells, or may be all neighbor cells having measurement results better than a measurement result corresponding to the current cell, or may be all cells with measurement results better than a preset threshold, or may be all cells, which is not limited in the embodiments of the present application.

It should be noted that the transmission operation may be performed by the UE based on the base station configuration of the current cell, or may be triggered by the UE itself to be performed. A condition for the UE itself to trigger the transmission operation may be that a measurement result corresponding to a neighbor cell is better than the measurement result corresponding to the current cell, or there are neighbor cells having measurement results better than the measurement result corresponding to the current cell in consecutive cell measurements, etc., which is not limited in the embodiments of the present application.

Step 220: making a cell handover decision based on the measurement result corresponding to one or more cells.

After receiving the measurement result corresponding to one or more cells transmitted by the UE, the base station of the current cell may make a cell handover decision based on the measurement result corresponding to one or more cells. For example, in case that the measurement result corresponding to one or more cells includes measurement results of the neighbor cell and the current cell, in case that the measurement result corresponding to the neighbor cell is better than the measurement result corresponding to the current cell, the base station of the current cell transmits a handover command to the UE. For another example, in case that the measurement result corresponding to one or more cells only includes the measurement results of the cell with the optimal measurement results, the base station may determine whether to perform a cell handover based on the number of times that it receives measurement results of a same cell.

In the method according to the embodiment of the present application, the base station may make a cell handover decision based on the measurement result, which is obtained by the UE performing cell measurement on CSI-RS resource sets corresponding to each cell. The cell measurement based on CSI-RS resource sets may be implemented only in layer 1 without the participation of layer 3, and further without introducing an additional filter in layer 3 for a filtering operation, which may avoid a delay caused by additional filtering operations and reduce a complexity of cell handover procedure, improves a data transmission quality of the UE and ensures a reliability of data transmission links.

Based on any of the above embodiments, each CSI-RS resource set corresponds to one cell, and the multiple CSI-RS resource sets are associated with one CSI reporting configuration.

The CSI-RS resource sets are in a one-to-one correspondence with the cells, and each cell is configured with one corresponding CSI-RS resources set, and then the UE may perform one or more cell measurements based on the CSI-RS resource sets corresponding to each cell, which facilitates a parallel cell measurement for multiple cells, and further shortens the time of the cell measurement and reducing the handover delay.

On above basis, the above multiple CSI-RS resource sets, that is, all CSI-RS resource sets, may be associated with the same CSI reporting configuration, to achieve a unified CSI reporting configuration for all CSI-RS resource sets. The referred CSI reporting configuration may include a reporting mechanism of a CSI measurement result (such as periodic reporting, semi-persistent reporting or aperiodic reporting), and may further include information that needs to be included in the reported measurement result. For example, the CSI reporting configuration may indicate that the UE periodically reports the optimal L1-RSRP measurement value corresponding to each CSI-RS resource set and an index of the CSI-RS resource corresponding to the optimal L1-RSRP measurement value, or indicate that the UE periodically reports the optimal L1-RSRP measurement value corresponding to the optimal CSI-RS resource set, an index of the CSI-RS resource corresponding to the optimal L1-RSRP measurement value and a cell ID corresponding to the optimal CSI-RS resource set. The referred optimal CSI-RS resource set is the CSI-RS resource set with the optimal measurement result among the above multiple CSI-RS resource sets.

Associating the multiple CSI-RS resource sets with the same CSI reporting configuration means that measurement results corresponding to the multiple CSI-RS resource sets needs to be reported based on the information indicated by the same CSI reporting configuration. For example, in case that the reporting mechanism indicated in the CSI reporting configuration is periodic reporting, the measurement results corresponding to the multiple CSI-RS resource sets need to be reported periodically. For another example, in case that the CSI reporting configuration indicates that the reported measurement result needs to include the optimal L1-RSRP measurement value, the reported measurement results corresponding to the multiple CSI-RS resource sets include the optimal L1-RSRP measurement value.

Based on any of the above embodiments, each CSI-RS resource set corresponds to a cell, each CSI-RS resource set is associated with the same CSI reporting configuration, and/or one or more CSI reporting configurations correspond to a CSI reporting state.

In an embodiment, the CSI-RS resource sets are in a one-to-one correspondence with the cells, and each cell is configured with one corresponding CSI-RS resources set, and then the UE may perform one or more cell measurements based on the CSI-RS resource sets corresponding to each cell, which facilitates a parallel cell measurement for multiple cells, and further shortens the time of the cell measurement and reducing the handover delay. On this basis, for the above multiple CSI-RS resource sets, that is, for the all CSI-RS resource sets, each CSI-RS resource set is associated with one CSI reporting configuration, and then different CSI-RS resource sets may correspond to the same or different CSI reporting configurations, which may improve a flexibility of CSI reporting.

The CSI reporting state is a superordinate concept of the CSI reporting configuration. By triggering the CSI reporting state, all the CSI reporting configurations corresponding to the CSI reporting state may be triggered. By establishing a correspondence between one or more CSI reporting configurations and one CSI reporting state, the CSI reporting configuration may be triggered synchronously.

Based on any of the above embodiments, each CSI-RS resource in each CSI-RS resource set corresponds to one cell, and each CSI-RS resource set is associated with one CSI reporting configuration.

In an embodiment, one CSI-RS resource set includes one or more CSI-RS resources. Each CSI-RS resource in each CSI-RS resource set corresponds to one cell, and different CSI-RS resources correspond to different cells. Correspondences between CSI-RS resources and cells enable the UE to perform one or more cell measurements based on corresponding CSI-RS resources of each cell, which facilitates a parallel cell measurement of multiple cells, and further shortens the time of the cell measurement and reducing the handover delay.

On this basis, one CSI-RS resource set is associated with one CSI reporting configuration to achieve a unified CSI reporting configuration for all CSI-RS resources in the CSI-RS resource set.

Associating one CSI-RS resource set with one CSI reporting configuration means that measurement results corresponding to all CSI-RS resources among a CSI-RS resource set need to be reported based on the information indicated by the same CSI reporting configuration. For example, in case that a reporting mechanism indicated in the CSI reporting configuration is periodic reporting, the measurement results corresponding to all CSI-RS resources among a CSI-RS resource set need to be reported periodically.

Based on any of the above embodiments, before the step 210, the method further includes:

transmitting resource set configuration information to the UE, where the resource set configuration information includes configuration information of CSI-RS resource sets, and configuration information of each CSI-RS resource set includes a cell ID of a corresponding cell, and the number of the CSI-RS resource sets is equal to the number of the cells.

The resource configuration information is used to indicate the configuration information of CSI-RS resource sets corresponding to each cell. Before cell handover is performed, the base station generates resource set configuration information and transmits the resource set configuration information to the UE. After receiving the resource set configuration information, the UE may configure corresponding CSI-RS resource sets for each cell based on the resource set configuration information. The configuration information of each CSI-RS resource set includes a cell ID used to identify a corresponding cell. The UE may determine a one-to-one correspondence between the CSI-RS resource set and the cell based on the cell ID in the configuration information of the CSI-RS resource set.

The UE may add the cell ID of the corresponding cell to the measurement result in case of reporting the measurement result based on the CSI-RS resource set to the base station of the current cell, and then after receiving the measurement result, the base station of the current cell may obtain the correspondence between the measurement result and the cell based on the cell ID included in the measurement result, and determine whether the cell handover is needed.

Based on any of the above embodiments, the measurement result corresponding to one or more cells includes at least one of the following items: cell ID of the one or more cells, set indexes of CSI-RS resource sets corresponding to the one or more cells, an optimal measurement value and indexes of CSI-RS resources in the CSI-RS resource sets corresponding to the one or more cells, or PMI of one or more CSI-RS resources in the CSI-RS resource sets corresponding to the one or more cells.

In an embodiment, before the UE transmits the measurement result corresponding to one or more cells to the base station, the UE may first determine the cell whose measurement result needs to be transmitted. Based on a CSI-RS resource set corresponding to the cell whose measurement result needs to be transmitted, CSI calculation for the cell whose measurement result needs to be transmitted is performed to obtain a PMI of the cell whose measurement result needs to be transmitted. Correspondingly, the measurement result corresponding to one or more cells may include the PMI of the CSI-RS resource set corresponding to the one or more cells. Accordingly, the measurement result corresponding to one or more cells received by the base station may include a PMI of the CSI-RS resource set corresponding to one or more cells.

In the method according to the embodiment of the present application, CSI-RS resource sets configured for each cell may be used not only for cell measurement, but also for PMI measurement feedback. The base station receives PMI while receiving the feedback of cell measurement results. Compared with a traditional scheme of indicating the UE to feedback PMI after determining cell handover, in the embodiment of the present application, a reception of PMI is completed before determining cell handover, which facilitates simplifying the cell handover procedure and reducing cell handover delay.

Based on any of the above embodiments, the optimal measurement value is the optimal value among the L1-RSRP measurement values corresponding to all CSI-RS resources in the CSI-RS resource set.

In an embodiment, the cell measurement performed by the UE is L1-RSRP measurement for the CSI-RS resource sets corresponding to each cell, to obtain the L1-RSRP measurement values corresponding to each cell.

Considering that the CSI-RS resource sets corresponding to each cell may include one or more CSI-RS resources, the UE may perform L1-RSRP measurement for each CSI-RS resource among the CSI-RS resource sets corresponding to each cell when measuring each cell, to obtain the L1-RSRP measurement value for each CSI-RS resource among the CSI-RS resource sets corresponding to each cell.

After obtaining the L1-RSRP measurement value for each CSI-RS resource among the CSI-RS resource sets corresponding to each cell, the UE may select the optimal L1-RSRP measurement value corresponding to each CSI-RS resource set, and take it as L1-RSRP measurement value for the whole corresponding CSI-RS resource set. The optimal L1-RSRP measurement value may be added to a measurement result corresponding to a cell. An index of a CSI-RS resource corresponding to the optimal L1-RSRP measurement value may also be added to the measurement result corresponding to a cell, which is not limited in the embodiments of the present application.

Based on any of the above embodiments, the measurement result corresponding to one or more cells is transmitted by the UE based on a measurement result reporting configuration of the base station of the current cell, and/or based on a predefined rule.

In an embodiment, there are three modes for the UE to transmit the measurement result corresponding to one or more cells to the base station of the current cell. One mode is to transmit the measurement results based on a measurement result reporting configuration pre-configured by the base station of the current cell. The referred measurement result reporting configuration may include the cell whose measurement result needs to be transmitted, a period of feeding back measurement result, and/or information included in the fed back measurement result, etc. For example, the measurement result reporting configuration may indicate the UE to periodically report the optimal L1-RSRP measurement value corresponding to each CSI-RS resource set and an index of the CSI-RS resource corresponding to the optimal L1-RSRP measurement value, or may indicate the UE to periodically report the optimal L1-RSRP measurement value corresponding to the optimal CSI-RS resource set and an index of the CSI-RS resource corresponding to the optimal L1-RSRP measurement value, as well as the cell ID corresponding to the optimal CSI-RS resource set. Another mode is that based on the predefined rule, the UE determines whether the measurement result obtained by performing the cell measurement satisfies the predefined rule, and then determines whether to feed back the cell measurement result. In addition, there may be another mode: the UE determines whether to feed back the cell measurement result by itself based on a measurement result reporting configuration pre-configured by the base station of the current cell in combination with predefined rule.

The pre-defined rule may be that there is a neighbor cell having a measurement result better than a measurement result corresponding to the current cell, or there is a neighbor cell having a measurement result better than a preset measurement threshold, or the measurement results of the current cell obtained by consecutive cell measurements are not reach a preset measurement threshold, etc., which is not limited in the embodiments of the present application.

Based on any of the above embodiments, the predefined rule includes that a neighbor cell has a measurement result better than a measurement result corresponding to the current cell, or the number of times that measurement result corresponding to any neighbor cell is better than the measurement result corresponding to the current cell is greater than a preset threshold. In an embodiment, the pre-defined rule may be that there is a neighbor cell having a measurement result better than the measurement result corresponding to the current cell. In this case, if the UE is triggered to handover from the current cell to the neighbor cell with better measurement result, link qualities may be optimized, therefore, handover is recommended. The UE may transmit the measurement result corresponding to the neighbor cell with better measurement result to the base station of the current cell.

Considering the stability of the link qualities, the predefined rule may be that the number of times that measurement result corresponding to any neighbor cell is better than the measurement result corresponding to the current cell is greater than a preset threshold, that is, there is a neighbor cell having a measurement result better than the measurement result corresponding to the current cell in consecutive cell measurements. In this case, if the UE is triggered to handover from the current cell to the neighbor cell with better measurement result, link qualities may be optimized, therefore, handover is recommended. The UE may transmit the measurement result corresponding to the neighbor cell with better measurement result to the base station of the current cell.

Based on any of the above embodiments, the measurement result corresponding to one or more cells is an optimal measurement result among measurement results of the multiple cells.

The measurement results received by the base station may be a measurement result corresponding to only one cell, that is, the optimal measurement result among all measurement results of all cells. The base station may receive a set index of the CSI-RS resource set with the optimal measurement result transmitted by the UE, or a cell ID configured in the CSI-RS resource set with the optimal measurement result transmitted by the UE. It may also include the optimal measurement value of each CSI-RS resource in the CSI-RS resource set with the optimal measurement result and an index of the CSI-RS resource corresponding to the optimal measurement value transmitted by the UE, or a PMI of the CSI-RS resource with the optimal measurement result transmitted by the UE may also be received together, which is not limited in the embodiments of the present application.

Based on any of the above embodiments, the measurement result corresponding to one or more cells is transmitted by the UE through a random access resource or an uplink resource request in case that the predefined rule is met.

In an embodiment, in case that the measurement result corresponding to each cell meets the predefined rule, the UE automatically triggers feedback of measurement result by itself. The feedback triggered by the UE itself may be fed back through random access resource, for example, feedback of measurement result is performed in the PRACH process. Feedback may also be performed through uplink resource request, for example, by using uplink resource request, the base station of the current cell allocates uplink resources for feedback of the measurement result, which is not limited in the embodiments of the present application.

Based on any of the above embodiments, the method further includes:

transmitting TA information or TA adjustment information of one or more cells to the UE, where the TA information and the TA adjustment information are used for the UE to access a target cell.

The base station transmits the TA information or TA adjustment information to the UE before or after the cell handover is determined. The transmitted TA information or TA adjustment information may be corresponding to each cell or only to the target cell, which is not limited in the embodiments of the present application.

The TA information or TA adjustment information corresponding to each cell transmitted by the base station of the current cell may be determined based on deployment of base station of each cell. For example, in a high-speed railway scenario, the TA information of each cell during handover may be determined based position relationships between tracks and multiple base stations.

In the case that the base station of the current cell has configured TA information of each cell to the UE in advance, the UE may do not perform the random access process when performing cell handover. In case of transmitting the cell handover command, the base station of the current cell may also configure an RRC parameter and/or other configuration information of the target cell to the UE. After obtaining the RRC parameter and/or other configuration information, the UE may perform data transmission with the target cell.

Based on any of the above embodiments, a method for cell handover includes the following steps.

The base station of the current cell may configure N CSI-RS resource sets for the UE, and each CSI-RS resource set corresponds to one cell. The resource set i includes M CSI-RS resources, where $1=0, 1, \ldots, N-1$, and N is greater than or equal to 1. Each CSI-RS resource set is configured with one cell ID for indicating that the corresponding CSI-RS resource set is transmitted by which cell. CSI-RS resources are transmitted periodically.

The UE performs L1-RSRP measurement on each CSI-RS resource in N CSI-RS resource sets. For CSI-RS resource set i, $M_i$ L1-RSRP measurement values may be obtained, and the optimal measurement value among the $M_i$ L1-RSRP measurement values is determined as an L1-RSRP measurement value for CSI-RS resource set i.

The UE compares the L1-RSRP measurement value corresponding to the current cell with the L1-RSRP measurement value corresponding to the neighbor cell. In case that the L1-RSRP measurement value corresponding to the neighbor cell is better than the L1-RSRP measurement value corresponding to the source gNB, the L1-RSRP measurement value corresponding to the neighbor cell is reported to the base station of the current cell. The index of the CSI-RS resource corresponding to this L1-RSRP measurement value is simultaneously reported. In addition, the index of the CSI-RS resource set corresponding to this L1-RSRP measurement value or the cell ID corresponding to this L1-RSRP measurement value may also be reported to the base station of the current cell.

For example, it is assumed that resource set 0 is the CSI-RS resource set transmitted by the base station of the current cell, and $M_0$ L1-RSRP measurement values may be obtained accordingly. The largest L1-RSRP measurement value is the RSRP corresponding to the third CSI-RS resource, which is represented as $$RSRP_2^0.$$

For the rest $(N-1)$ CSI-RS resource sets, the largest L1-RSRP measurement value is the RSRP corresponding to the fifth CSI-RS resource in CSI-RS resource set 3, which is represented as $$RSRP_4^3.$$

In case that $$RSRP_4^3 \le RSRP_2^0,$$

it indicates that the quality of the current cell is the best, there is no need to handover, and the UE does not perform any reporting action. In case that $$RSRP_4^3 > RSRP_2^0,$$

it indicates that the quality of neighbor cell is better, and handover is recommended. The UE triggers cell handover reporting, and reports the index of CSI-RS resource set 3 corresponding to $$RSRP_4^3$$

and the index of the fifth CSI-RS resource in CSI-RS resource set 3. The UE may also report $$RSRP_4^3.$$

In one embodiment, the UE may report a cell ID corresponding to CSI-RS resource set 3 and the index of the fifth CSI-RS resource in CSI-RS resource set 3. In addition, in order to ensure stability, a preset threshold S may be predefined, where S is greater than 1. In case that the number of times that the RSRP of the neighbor cell exceeds the RSRP of the current cell is greater than the preset threshold S, the handover report of the UE is triggered.

Based on any of the above embodiments, a method for cell handover includes the following steps.

The base station of the current cell may configure N CSI-RS resource sets for the UE, and each CSI-RS resource set corresponds to one cell. The resource set i includes M CSI-RS resources, where 1=0, 1, . . . , N–1, and N is greater than or equal to 1. Each CSI-RS resource set is configured with one cell ID for indicating that the corresponding CSI-RS resource set is transmitted by which cell. CSI-RS resources are transmitted periodically.

The N CSI-RS resource sets are associated with one CSI reporting configuration; or each resource set among the N CSI-RS resource sets is associated with one CSI reporting configuration, and the N CSI reporting configurations are associated with one CSI reporting state. In the reporting configuration, the UE may be configured to periodically report the optimal L1-RSRP measurement values corresponding to each resource set and indexes of the CSI-RS resource corresponding to the optimal L1-RSRP s. Therefore, the UE reports N L1-RSRP measurement values and N indexes of CSI-RS resources each time. The CSI-RS resource set i is determined as an example, it includes $M_i$ CSI-RS resources, where the seventh CSI-RS resource has the largest L1-RSRP measurement value, which is represented as $$RSRP_6^i. \; RSRP_6^i$$

is reported while reporting the index of the seventh CSI-RS resource. After receiving N L1-RSRP measurement values, the source base station may compare the RSRP of the neighbor cell with the RSRP of the current cell, to determine whether to perform cell handover.

In addition, the base station of the current cell may configure the UE to periodically report the optimal L1-RSRP measurement value corresponding to the optimal CSI-RS resource set and the index of the CSI-RS resource corresponding to the optimal L1-RSRP measurement value, and then the UE reports one L1-RSRP measurement value and an index of one CSI-RS resource each time. For example, the UE may sort the L1-RSRPs obtained by measuring all CSI-RS resources in N CSI-RS resource sets. It is assumed that the L1-RSRP with the largest value corresponds to the third CSI-RS resource in CSI-RS resource set 6, the UE reports the L1-RSRP corresponding to this resource, which is represented as $$RSRP_2^6,$$

and reports the index of CSI-RS resource set 6. The base station of the current cell determines whether to perform cell handover based on a repetition factor of the optimal resource set index reported periodically.

Based on any of the above embodiments, the UE selects, from CSI-RS resources in the CSI-RS resource sets corresponding to the target cell, a beam corresponding to a CSI-RS resource having an optimal measurement result as a preamble sequence transmission beam, and transmits the random access preamble sequence to the base station of the target cell based on the preamble sequence transmission beam.

The base station of the target cell transmits RAR message to the UE after monitoring the random access preamble sequence. The RAR message may include TA information, but do not include uplink channel resource allocation information, and then the UE may access the target cell based on the TA information included in the RAR message.

In an embodiment, the RAR message is only used for confirmation of random access, and includes neither TA information nor uplink channel resource allocation information, and then the UE may select the TA information of the target cell from the TA information of multiple cells preconfigured by the base station of the current cell to the UE, and then access the target cell through the pre-configured TA information.

After determining the access of the UE, the target cell may perform data transmission with the UE.

The solutions according to the embodiments of the present application may be applicable to various systems, especially 5G systems. For example, the applicable systems may be a global system of mobile communication (GSM) system, a code division multiple access (CDMA) system, a wideband code division multiple access (WCDMA) general packet radio service (GPRS) system, a long term evolution (LTE) system, a LTE frequency division duplex (FDD) system, a LTE time division duplex (TDD) system, a long term evolution advanced (LTE-A) system, a universal mobile telecommunication system (UMTS), a worldwide interoperability for microwave access (WiMAX) system, a 5G New Radio (NR) system, etc. These various systems include a terminal device (such as a UE) and a network side device. The system may also include a core network part, such as an evolved packet system (EPS), a 5G system (5GS), and the like.

The terminal device in the embodiments of the present application may be a device that provides voice and/or data connectivity to a user, a handheld device with a wireless connection function, or other processing devices connected to a wireless modem. In different systems, the names of the terminal devices may be different. For example, in the 5G system, a terminal device may be called as user equipment (UE). A wireless terminal device may communicate with one or more core networks (CN) via a radio access network (RAN), and the wireless terminal device may be a mobile terminal device, such as a mobile phone (or cellular phone) and computers with mobile terminal device, e.g., a portable mobile device, a pocket-sized mobile device, a hand-held mobile device, a computer-built mobile device or a vehicle-mounted mobile device, which exchange language and/or data with the radio access network. For example, a personal communication service (PCS) phone, a radio phone, a session initiated protocol (SIP) phone, a wireless local loop (WLL) station, a personal digital assistant (PDA) and other devices. A wireless terminal device may also be called a system, a subscriber unit, a subscriber station, a mobile station, a mobile, a remote station, an access point, a remote terminal device, an access terminal device, a user terminal device, a user agent, and a user device, which are not limited in the embodiments of the present application.

The base station in the embodiments of the present application may include multiple cells providing services for the terminal device. Depending on specific scenarios, the base station may also be called an access point, or may be a device in the access network that communicates with wireless terminal device through one or more sectors on the air interface, or other names. The network device may be used to exchange received air frames with internet protocol (IP) packets, and act as a router between wireless terminal device and the rest of the access network, and the rest of access network may include an IP communication network.

The network devices may also coordinate attribute management for the air interface. For example, the network device in the embodiments of the present application may be a base transceiver station (BTS) in a global system for mobile communications (GSM) or a code division multiple access (CDMA), it may also be a node B in a wide-band code division multiple access (WCDMA), it may also be an evolutional node B (eNB or e-Node B) in a long term evolution (LTE) system, a 5G base station (gNB) in 5G network architecture (next generation system), may also be a home evolved node B (HeNB), a relay node, a femto, a pico, etc., which are not limited in the embodiments of the present application. In some network structures, a network device may include a centralized unit (CU) node and a distributed unit (DU) node, and the centralized unit and the distributed unit may be geographically separated.

FIG. 4 a schematic structural diagram of a user equipment (UE) according to an embodiment of the present application. As shown in FIG. 4, the UE includes a memory 420, a transceiver 410, a processor 400 and a user interface 430.

The memory 420 is used to store a computer program, the transceiver 410 is used to transmit and receive data under a control of the processor 400, and the processor 400 is used to read the computer program in the memory 420 and perform the following operations of:

performing cell measurement on multiple cells based on multiple channel state information reference signal (CSI-RS) resource sets corresponding to the multiple cells; and transmitting a measurement result corresponding to one or more cells among the multiple cells to a base station of a current cell, where the measurement result of one or more cells is used for making a cell handover decision for the base station of the current cell.

The transceiver 410 is used to receive and transmit data under the control of the processor 400.

In FIG. 4, the bus architecture may include any number of interconnected buses and bridges, which are linked together through various circuits of one or more processors represented by processor 400 and one or more memories represented by the memory 420. The bus architecture may also link various other circuits, such as peripheral devices, voltage regulators and power management circuits. The bus interface provides interfaces. The transceiver 410 may include multiple elements, including a transmitter and a receiver. They provide a device for communicating with various other apparatuses on a transmission medium, including wireless channels, wired channels, optical cables and other transmission medium. For different user equipment, the user interface 430 may be an interface that may connect the required equipment externally and internally. The connected equipment includes but is not limited to a keypad, a display, a speaker, a microphone, a joystick, etc.

The processor 400 is responsible for managing the bus architecture and general processing, and the memory 420 may store the data used by the processor 400 when performing operations.

The processor 400 may be a central processor (CPU), an application specific integrated circuit (ASIC), a field-programmable gate array (FPGA) or a complex programmable logic device (CPLD). The processor 400 may adopt multi-core architectures.

It should be noted that the UE according to embodiments of the present application may implement all the method steps implemented by the above-mentioned method embodiments, and may achieve the same effect. The same parts and beneficial effects as the same method embodiments are not repeated here.

In an embodiment, according to the UE of an embodiment of the present application, each CSI-RS resource set corresponds to one cell, and the multiple CSI-RS resource sets are associated with one CSI reporting configuration; or each CSI-RS resource set corresponds to one cell, each CSI-RS resource set is associated with one CSI reporting configuration, and one or more CSI reporting configurations correspond to one CSI reporting state; or each CSI-RS resource in the CSI-RS resource set corresponds to one cell, and each CSI-RS resource set is associated with one CSI reporting configuration.

In an embodiment, according to the UE of an embodiment of the present application, the performing cell measurement on multiple cells based on CSI-RS resource sets corresponding to the multiple cells includes:

performing, based on an indicator in the CSI reporting configuration, at least one of layer 1 reference signal receiving power (L1-RSRP) measurement, spatial-filtered L1-RSRP measurement, layer 3 reference signal receiving power (L3-RSRP) measurement, or spatial-filtered L3-RSRP measurement on CSI-RS resource sets corresponding to each CSI reporting configuration.

In an embodiment, according to the UE of an embodiment of the present application, the performing L1-RSRP measurement on CSI-RS resource sets corresponding to each CSI reporting configuration includes:

performing the L1-RSRP measurement on each CSI-RS resource among the CSI-RS resource sets corresponding to each CSI reporting configuration, to obtain an L1-RSRP measurement value for each CSI-RS resource; and determining a measurement result corresponding to each CSI reporting configuration based on the L1-RSRP measurement value for each CSI-RS resource.

In an embodiment, according to the UE of an embodiment of the present application, the performing spatial-filtered L1-RSRP measurement on CSI-RS resource sets corresponding to each CSI reporting configuration includes:

performing the L1-RSRP measurement on each CSI-RS resource among the CSI-RS resource sets corresponding to each CSI reporting configuration, and averaging all L1-RSRP measurement results to obtain a measurement result corresponding to each CSI reporting configuration.

In an embodiment, according to the UE of an embodiment of the present application, the performing L3-RSRP measurement on CSI-RS resource sets corresponding to each CSI reporting configuration includes:

performing the L3-RSRP measurement on each CSI-RS resource among the CSI-RS resource sets corresponding to each CSI reporting configuration, to obtain an L3-RSRP measurement value for each CSI-RS resource; and determining a measurement result corresponding to each CSI reporting configuration based on the L3-RSRP measurement value for each CSI-RS resource.

In an embodiment, according to the UE of an embodiment of the present application, the performing spatial-filtered L3-RSRP measurement on CSI-RS resource sets corresponding to each CSI reporting configuration includes:

performing the L3-RSRP measurement on each CSI-RS resource among the CSI-RS resource sets corresponding to each CSI reporting configuration, and averaging all L3-RSRP measurement results to obtain a measurement result corresponding to each CSI reporting configuration.

In an embodiment, according to the UE of an embodiment of the present application, each CSI-RS resource set is configured with cell IDs corresponding to the one or more cells.

In an embodiment, according to the UE of an embodiment of the present application, the measurement result corresponding to one or more cells includes at least one of the following items: cell ID of the one or more cells, set indexes of CSI-RS resource sets corresponding to the one or more cells, an optimal measurement value and indexes of CSI-RS resources in the CSI-RS resource sets corresponding to the one or more cells, or precoding matrix indicators (PMIs) of the CSI-RS resource sets corresponding to the one or more cells.

In an embodiment, according to the UE of an embodiment of the present application, the transmitting the measurement result corresponding to one or more cells among the multiple cells to the base station of the current cell includes:

transmitting the measurement result corresponding to one or more cells among the multiple cells to the base station of the current cell based on a measurement result reporting configuration of the base station of the current cell and/or based on a predefined rule.

In an embodiment, according to the UE of an embodiment of the present application, the predefined rule includes that a neighbor cell has a measurement result better than a measurement result corresponding to the current cell, or the number of times that measurement result corresponding to any neighbor cell is better than the measurement result corresponding to the current cell is greater than a preset threshold.

In an embodiment, according to the UE of an embodiment of the present application, the transmitting the measurement result corresponding to one or more cells among the multiple cells to the base station of the current cell includes:

transmitting an optimal measurement result among measurement results of the multiple cells to the base station of the current cell.

In an embodiment, according to the UE of an embodiment of the present application, the transmitting the measurement result corresponding to one or more cells among the multiple cells to the base station of the current cell based on the predefined rule includes:

transmitting the measurement result corresponding to one or more cells to the base station of the current cell through a random access resource or an uplink resource request in case that the predefined rule is met.

In an embodiment, according to the UE of an embodiment of the present application, after the transmitting the measurement result corresponding to one or more cells among the multiple cells to the base station of the current cell, the computer program, when executed by, causes the UE to further perform the following operations:

transmitting a random access preamble sequence to a base station of a target cell to be handed over; and receiving random access response (RAR) message fed back based on the random access preamble sequence by the base station of the target cell.

In an embodiment, according to the UE of an embodiment of the present application, after the receiving RAR message fed back based on the random access preamble sequence by the base station of the target cell, the computer program, when executed by the processor, causes the UE to further perform the following operations:

in case that the RAR message includes timing advance (TA) information, accessing the target cell based on the TA information in the RAR message; or determining TA information of the target cell from TA information of one or more cells pre-configured by the base station of the current cell, and accessing the target cell based on the TA information of the target cell.

In an embodiment, according to the UE of an embodiment of the present application, the transmitting the random access preamble sequence to the base station of the target cell to be handed over includes:

selecting, from CSI-RS resources in the CSI-RS resource sets corresponding to the target cell, a beam corresponding to a CSI-RS resource having an optimal measurement result as a preamble sequence transmission beam, and transmitting the random access preamble sequence to the base station of the target cell based on the preamble sequence transmission beam.

In an embodiment, according to the UE of an embodiment of the present application, the computer program, when executed by the processor, causes the UE to further perform the following operations:

receiving TA information or TA adjustment information transmitted by the base station of the current cell, where the TA information and the TA adjustment information are used for the UE to access a target cell.

FIG. 5 a schematic structural diagram of a base station according to an embodiment of the present application. As shown in FIG. 5, the base station includes a memory 520, a transceiver 510 and a processor 500.

The memory 520 is used to store a computer program, the transceiver 510 is used to transmit and receive data under a control of the processor 500, and the processor 500 is used to read the computer program in the memory 520 and perform the following operations of:

receiving a measurement result corresponding to one or more cells transmitted by a user equipment (UE), where the measurement result corresponding to one or more cells is obtained by performing, by the UE, cell measurement on multiple cells based on multiple channel state information reference signal (CSI-RS) resource sets corresponding to the multiple cells; and making a cell handover decision based on the measurement result corresponding to one or more cells.

The transceiver 510 is used to receive and transmit data under the control of the processor 500.

In FIG. 5, the bus architecture may include any number of interconnected buses and bridges, which are linked together through various circuits of one or more processors represented by processor 500 and one or more memories represented by the memory 520. The bus architecture may also link various other circuits, such as peripheral devices, voltage regulators and power management circuits. The bus interface provides interfaces. The transceiver 510 may include multiple elements, including a transmitter and a receiver. They provide a device for communicating with various other apparatuses on a transmission medium, including wireless channels, wired channels, optical cables and other transmission medium. For different user equipment, the user interface 530 may be an interface that may connect the required equipment externally and internally. The connected equipment includes but is not limited to a keypad, a display, a speaker, a microphone, a joystick, etc.

The processor 500 is responsible for managing the bus architecture and general processing, and the memory 520 may store the data used by the processor 500 when performing operations.

The processor 500 may be a central processor (CPU), an application specific integrated circuit (ASIC), a field-programmable gate array (FPGA) or a complex programmable logic device (CPLD). The processor 500 may adopt multi-core architectures.

It should be noted that the base station according to embodiments of the present application may implement all the method steps implemented by the above-mentioned method embodiments, and may achieve the same effect. The same parts and beneficial effects as the same method embodiments are not repeated here.

In an embodiment, according to the base station of an embodiment of the present application, each CSI-RS resource set corresponds to one cell, and the multiple CSI-RS resource sets are associated with one CSI reporting configuration; or each CSI-RS resource set corresponds to one cell, each CSI-RS resource set is associated with one CSI reporting configuration, and one or more CSI reporting configurations correspond to one CSI reporting state; or each CSI-RS resource in the CSI-RS resource set corresponds to one cell, and each CSI-RS resource set is associated with one CSI reporting configuration.

In an embodiment, according to the base station of an embodiment of the present application, before the receiving the measurement result corresponding to one or more cells transmitted by the UE, the computer program, when executed by the processor, causes the base station to further perform the following operations:

transmitting resource set configuration information to the UE, where the resource set configuration information includes configuration information of CSI-RS resource sets, and configuration information of each CSI-RS resource set includes a cell ID of a corresponding cell, and the number of the CSI-RS resource sets is equal to the number of the cells.

In an embodiment, according to the base station of an embodiment of the present application, the measurement result corresponding to one or more cells includes at least one of the following items: cell ID of the one or more cells, set indexes of CSI-RS resource sets corresponding to the one or more cells, an optimal measurement value and indexes of CSI-RS resources in the CSI-RS resource sets corresponding to the one or more cells, or precoding matrix indicators (PMIs) of one or more CSI-RS resource in the CSI-RS resource sets corresponding to the one or more cells.

In an embodiment, according to the base station of an embodiment of the present application, the optimal measurement value is an optimal value among all layer 1 reference signal receiving power (L1-RSRP) measurement values corresponding to all CSI-RS resources among CSI-RS resource set.

In an embodiment, according to the base station of an embodiment of the present application, the measurement result corresponding to one or more cells is transmitted by the UE based on a measurement result reporting configuration of a base station of a current cell and/or based on a predefined rule.

In an embodiment, according to the base station of an embodiment of the present application, the predefined rule includes that a neighbor cell has a measurement result better than a measurement result corresponding to the current cell, or the number of times that measurement result corresponding to any neighbor cell is better than the measurement result corresponding to the current cell is greater than a preset threshold.

In an embodiment, according to the base station of an embodiment of the present application, the measurement result corresponding to one or more cells is an optimal measurement result among measurement results of the multiple cells.

In an embodiment, according to the base station of an embodiment of the present application, the measurement result corresponding to one or more cells is transmitted by the UE through a random access resource or an uplink resource request in case that the predefined rule is met.

In an embodiment, according to the base station of an embodiment of the present application, and the computer program, when executed by the processor, causes the base station to further perform the following operations:

transmitting timing advance (TA) information or TA adjustment information of one or more cells to the UE, where the TA information and the TA adjustment information are used for the UE to access a target cell.

Figure 6:
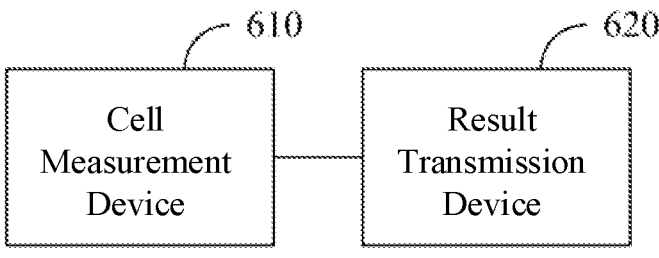
FIG. 6 is a schematic structural diagram of an apparatus for cell handover according to an embodiment of the present application.

FIG. 6 is a schematic structural diagram of an apparatus for cell handover according to an embodiment of the present application. As shown in FIG. 6, the apparatus includes a cell measurement device 610 and a result transmitting device 620, where the cell measurement device 610 is used to perform cell measurement on multiple cells based on state information reference signal (CSI-RS) resource sets corresponding to the multiple cells; and the result transmitting device 620 is used to transmit a measurement result corresponding to one or more cells among the multiple cells to a base station of a current cell, where the measurement result of one or more cells is used for making a cell handover decision for the base station of the current cell.

It should be noted that the apparatus for cell handover according to embodiments of the present application may implement all the method steps implemented by the above-mentioned method embodiments, and may achieve the same effect. The same parts and beneficial effects as the same method embodiments are not repeated here.

Based on any of the above embodiments, each CSI-RS resource set corresponds to one cell, and the multiple CSI-RS resource sets are associated with one CSI reporting configuration; or each CSI-RS resource set corresponds to one cell, each CSI-RS resource set is associated with one CSI reporting configuration, and one or more CSI reporting configurations correspond to one CSI reporting state; or each CSI-RS resource in the CSI-RS resource set corresponds to one cell, and each CSI-RS resource set is associated with one CSI reporting configuration.

It should be noted that the apparatus for cell handover according to embodiments of the present application may implement all the method steps implemented by the above-mentioned method embodiments, and may achieve the same effect. The same parts and beneficial effects as the same method embodiments are not repeated here.

Based on any of the above embodiments, the cell measurement device 610 is used to:

perform, based on an indicator in the CSI reporting configuration, at least one of layer 1 reference signal receiving power (L1-RSRP) measurement, spatial-filtered L1-RSRP measurement, layer 3 reference signal receiving power (L3-RSRP) measurement, or spatial-filtered L3-RSRP measurement on CSI-RS resource sets corresponding to each CSI reporting configuration.

It should be noted that the apparatus for cell handover according to embodiments of the present application may implement all the method steps implemented by the above-mentioned method embodiments, and may achieve the same effect. The same parts and beneficial effects as the same method embodiments are not repeated here.

Based on any of the above embodiments, the cell measurement device 610 is used to:

perform the L1-RSRP measurement on each CSI-RS resource among the CSI-RS resource sets corresponding to each CSI reporting configuration, to obtain an L1-RSRP measurement value for each CSI-RS resource; and determine a measurement result corresponding to each CSI reporting configuration based on the L1-RSRP measurement value for each CSI-RS resource.

It should be noted that the apparatus for cell handover according to embodiments of the present application may implement all the method steps implemented by the above-mentioned method embodiments, and may achieve the same effect. The same parts and beneficial effects as the same method embodiments are not repeated here.

Based on any of the above embodiments, the cell measurement device 610 is used to:

perform the L1-RSRP measurement on each CSI-RS resource among the CSI-RS resource sets corresponding to each CSI reporting configuration, and average all L1-RSRP measurement results to obtain a measurement result corresponding to each CSI reporting configuration.

It should be noted that the apparatus for cell handover according to embodiments of the present application may implement all the method steps implemented by the above-mentioned method embodiments, and may achieve the same effect. The same parts and beneficial effects as the same method embodiments are not repeated here.

Based on any of the above embodiments, the cell measurement device 610 is used to:

perform the L3-RSRP measurement on each CSI-RS resource among the CSI-RS resource sets corresponding to each CSI reporting configuration, to obtain an L3-RSRP measurement value for each CSI-RS resource; and determine a measurement result corresponding to each CSI reporting configuration based on the L3-RSRP measurement value for each CSI-RS resource.

It should be noted that the apparatus for cell handover according to embodiments of the present application may implement all the method steps implemented by the above-mentioned method embodiments, and may achieve the same effect. The same parts and beneficial effects as the same method embodiments are not repeated here.

Based on any of the above embodiments, the cell measurement device 610 is used to:

perform the L3-RSRP measurement on each CSI-RS resource among the CSI-RS resource sets corresponding to each CSI reporting configuration, and average all L3-RSRP measurement results to obtain a measurement result corresponding to each CSI reporting configuration.

It should be noted that the apparatus for cell handover according to embodiments of the present application may implement all the method steps implemented by the above-mentioned method embodiments, and may achieve the same effect. The same parts and beneficial effects as the same method embodiments are not repeated here.

Based on any of the above embodiments, each CSI-RS resource set is configured with cell IDs corresponding to the one or more cells.

It should be noted that the apparatus for cell handover according to embodiments of the present application may implement all the method steps implemented by the above-mentioned method embodiments, and may achieve the same effect. The same parts and beneficial effects as the same method embodiments are not repeated here.

Based on any of the above embodiments, the measurement result corresponding to one or more cells includes at least one of the following items: cell ID of the one or more cells, set indexes of CSI-RS resource sets corresponding to the one or more cells, an optimal measurement value and resource indexes of CSI-RS resources in the CSI-RS resource sets corresponding to the one or more cells, or precoding matrix indicators (PMIs) of the CSI-RS resource sets corresponding to the one or more cells.

It should be noted that the apparatus for cell handover according to embodiments of the present application may implement all the method steps implemented by the above-mentioned method embodiments, and may achieve the same effect. The same parts and beneficial effects as the same method embodiments are not repeated here.

Based on any of the above embodiments, the result transmitting device 620 is used to:

transmit the measurement result corresponding to one or more cells among the multiple cells to the base station of the current cell based on a measurement result reporting configuration of the base station of the current cell and/or based on a predefined rule.

It should be noted that the apparatus for cell handover according to embodiments of the present application may implement all the method steps implemented by the above-mentioned method embodiments, and may achieve the same effect. The same parts and beneficial effects as the same method embodiments are not repeated here.

Based on any of the above embodiments, the predefined rule includes that a neighbor cell has a measurement result better than a measurement result corresponding to the current cell, or the number of times that measurement result corresponding to any neighbor cell is better than the measurement result corresponding to the current cell is greater than a preset threshold.

It should be noted that the apparatus for cell handover according to embodiments of the present application may implement all the method steps implemented by the abovementioned method embodiments, and may achieve the same effect. The same parts and beneficial effects as the same method embodiments are not repeated here.

Based on any of the above embodiments, the result transmitting device 620 is used to:

transmit an optimal measurement result among measurement results of the multiple cells to the base station of the current cell.

It should be noted that the apparatus for cell handover according to embodiments of the present application may implement all the method steps implemented by the abovementioned method embodiments, and may achieve the same effect. The same parts and beneficial effects as the same method embodiments are not repeated here.

Based on any of the above embodiments, the result transmitting device 620 is used to:

transmit the measurement result corresponding to one or more cells to the base station of the current cell through a random access resource or an uplink resource request in case that the predefined rule is met.

It should be noted that the apparatus for cell handover according to embodiments of the present application may implement all the method steps implemented by the abovementioned method embodiments, and may achieve the same effect. The same parts and beneficial effects as the same method embodiments are not repeated here.

Based on any of the above embodiments, the apparatus further includes a random access device, which is used to:

transmit a random access preamble sequence to a base station of a target cell to be handed over; and receive random access response (RAR) message fed back based on the random access preamble sequence by the base station of the target cell.

It should be noted that the apparatus for cell handover according to embodiments of the present application may implement all the method steps implemented by the abovementioned method embodiments, and may achieve the same effect. The same parts and beneficial effects as the same method embodiments are not repeated here.

Based on any of the above embodiments, the apparatus further includes a target cell access device, which is used to:

in case that the RAR message includes timing advance (TA) information, access the target cell based on the TA information in the RAR; or determine TA information of the target cell from TA information of one or more cells pre-configured by the base station of the current cell, and access the target cell based on the TA information of the target cell.

It should be noted that the apparatus for cell handover according to embodiments of the present application may implement all the method steps implemented by the abovementioned method embodiments, and may achieve the same effect. The same parts and beneficial effects as the same method embodiments are not repeated here.

Based on any of the above embodiments, the random access device is used to:

select, from CSI-RS resources in the CSI-RS resource sets corresponding to the target cell, a beam corresponding to a CSI-RS resource having an optimal measurement result as a preamble sequence transmission beam, and transmitting the random access preamble sequence to the base station of the target cell based on the preamble sequence transmission beam.

It should be noted that the apparatus for cell handover according to embodiments of the present application may implement all the method steps implemented by the abovementioned method embodiments, and may achieve the same effect. The same parts and beneficial effects as the same method embodiments are not repeated here.

Based on any of the above embodiments, the apparatus further includes a TA configuring device, which is used to:

receive TA information or TA adjustment information transmitted by the base station of the current cell, where the TA information and the TA adjustment information are used for a UE to access a target cell.

It should be noted that the apparatus for cell handover according to embodiments of the present application may implement all the method steps implemented by the abovementioned method embodiments, and may achieve the same effect. The same parts and beneficial effects as the same method embodiments are not repeated here.

Figure 7:
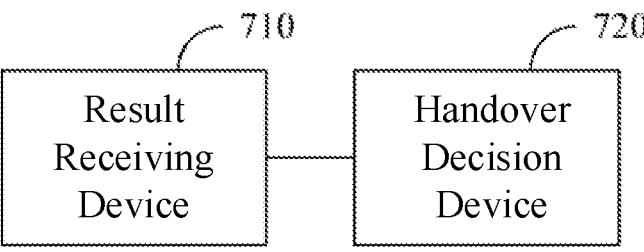
FIG. 7 is a schematic structural diagram of an apparatus for cell handover according to another embodiment of the present application.

FIG. 7 is a schematic structural diagram of an apparatus for cell handover according to another embodiment of the present application. As shown in FIG. 7, the apparatus includes a result receiving device 710 and a handover decision device 720, where the result receiving device 710 is used to receive a measurement result corresponding to one or more cells transmitted by a user equipment (UE), where the measurement result corresponding to one or more cells is obtained by performing, by the UE, cell measurement on multiple cells based on multiple channel state information reference signal (CSI-RS) resource sets corresponding to the multiple cells; and the handover decision device 720 is used to make a cell handover decision based on the measurement result corresponding to one or more cells.

It should be noted that the apparatus for cell handover according to embodiments of the present application may implement all the method steps implemented by the abovementioned method embodiments, and may achieve the same effect. The same parts and beneficial effects as the same method embodiments are not repeated here.

Based on any of the above embodiments, each CSI-RS resource set corresponds to one cell, and the multiple CSI-RS resource sets are associated with one CSI reporting configuration; or each CSI-RS resource set corresponds to one cell, each CSI-RS resource set is associated with one CSI reporting configuration, and one or more CSI reporting configurations correspond to one CSI reporting state; or each CSI-RS resource in the CSI-RS resource set corresponds to one cell, and each CSI-RS resource set is associated with one CSI reporting configuration.

It should be noted that the apparatus for cell handover according to embodiments of the present application may implement all the method steps implemented by the abovementioned method embodiments, and may achieve the same effect. The same parts and beneficial effects as the same method embodiments are not repeated here.

Based on any of the above embodiments, the apparatus further includes a set configuration transmitting device, which is used to:

transmit resource set configuration information to the UE, where the resource set configuration information includes configuration information of CSI-RS resource sets, and configuration information of each CSI-RS resource set includes a cell ID of a corresponding cell, and the number of the CSI-RS resource sets is equal to the number of the cells.

It should be noted that the apparatus for cell handover according to embodiments of the present application may implement all the method steps implemented by the above-mentioned method embodiments, and may achieve the same effect. The same parts and beneficial effects as the same method embodiments are not repeated here.

Based on any of the above embodiments, the measurement result corresponding to one or more cells includes at least one of the following items: cell ID of the one or more cells, set indexes of CSI-RS resource sets corresponding to the one or more cells, an optimal measurement value and indexes of CSI-RS resources in the CSI-RS resource sets corresponding to the one or more cells, or precoding matrix indicators (PMIs) of one or more CSI-RS resource in the CSI-RS resource sets corresponding to the one or more cells.

It should be noted that the apparatus for cell handover according to embodiments of the present application may implement all the method steps implemented by the above-mentioned method embodiments, and may achieve the same effect. The same parts and beneficial effects as the same method embodiments are not repeated here.

Based on any of the above embodiments, the optimal measurement value is an optimal value among all layer 1 reference signal receiving power (L1-RSRP) measurement values corresponding to all CSI-RS resources among CSI-RS resource set.

It should be noted that the apparatus for cell handover according to embodiments of the present application may implement all the method steps implemented by the above-mentioned method embodiments, and may achieve the same effect. The same parts and beneficial effects as the same method embodiments are not repeated here.

Based on any of the above embodiments, the measurement result corresponding to one or more cells is transmitted by the UE based on a measurement result reporting configuration of a base station of a current cell and/or based on a predefined rule.

It should be noted that the apparatus for cell handover according to embodiments of the present application may implement all the method steps implemented by the above-mentioned method embodiments, and may achieve the same effect. The same parts and beneficial effects as the same method embodiments are not repeated here.

Based on any of the above embodiments, the predefined rule includes that a neighbor cell has a measurement result better than a measurement result corresponding to the current cell, or the number of times that measurement result corresponding to any neighbor cell is better than the measurement result corresponding to the current cell is greater than a preset threshold.

It should be noted that the apparatus for cell handover according to embodiments of the present application may implement all the method steps implemented by the above-mentioned method embodiments, and may achieve the same effect. The same parts and beneficial effects as the same method embodiments are not repeated here.

Based on any of the above embodiments, the measurement result corresponding to one or more cells is an optimal measurement result among measurement results of the multiple cells.

It should be noted that the apparatus for cell handover according to embodiments of the present application may implement all the method steps implemented by the above-mentioned method embodiments, and may achieve the same effect. The same parts and beneficial effects as the same method embodiments are not repeated here.

Based on any of the above embodiments, the measurement result corresponding to one or more cells is transmitted by the UE through a random access resource or an uplink resource request in case that the predefined rule is met.

It should be noted that the apparatus for cell handover according to embodiments of the present application may implement all the method steps implemented by the above-mentioned method embodiments, and may achieve the same effect. The same parts and beneficial effects as the same method embodiments are not repeated here.

Based on any of the above embodiments, the apparatus further includes a timing configuration transmitting device, which is used to:

transmit timing advance (TA) information or TA adjustment information of one or more cells to the UE, where the TA information and the TA adjustment information are used for the UE to access a target cell.

It should be noted that the apparatus for cell handover according to embodiments of the present application may implement all the method steps implemented by the above-mentioned method embodiments, and may achieve the same effect. The same parts and beneficial effects as the same method embodiments are not repeated here.

The division of devices in the embodiments of the present application is schematic and is only a logical function division. There may be other division modes in actual implementation. In addition, each functional device in each embodiment of the present application may be integrated in one processing device, or each device may exist physically alone, or two or more devices may be integrated in one device. The above integrated devices may be implemented in the form of hardware or software functional devices.

In case that the integrated device is implemented in the form of software functional device and sold or used as an independent product, it may be stored in a non-transient computer-readable storage medium. Based on this understanding, the solutions of the present application may be embodied in the form of software products, which are stored in a storage medium, including several instructions to cause a computer device (which may be a personal computer, a server, a network device, etc.) or a processor to perform all or part of the steps of the method described in the embodiments of the present application. The aforementioned storage medium includes: a USB flash disk, a removable hard disk, a read-only memory (ROM), a random access memory (RAM), a magnetic disk or an optical disk and other medium that may store program code.

An embodiment of the present application provides a non-transient computer-readable storage medium having stored thereon a computer program that cause a processor to execute the steps of the method for cell handover according to the above-mentioned embodiments, including:

performing cell measurement on multiple cells based on multiple channel state information reference signal (CSI-RS) resource sets corresponding to the multiple cells; and transmitting a measurement result corresponding to one or more cells among the multiple cells to a base station of a current cell, where the measurement result of one or more cells is used for making a cell handover decision for the base station of the current cell.

An embodiment of the present application provides a non-transient computer-readable storage medium having stored thereon a computer program that cause a processor to execute the steps of the method for cell handover according to the above-mentioned embodiments, including:

receiving a measurement result corresponding to one or more cells transmitted by a user equipment (UE), where the measurement result corresponding to one or more cells is obtained by performing, by the UE, cell measurement on multiple cells based on multiple channel state information reference signal (CSI-RS) resource sets corresponding to the multiple cells; and making a cell handover decision based on the measurement result corresponding to one or more cells.

It should be noted that the computer program stored on the non-transient computer-readable storage medium according to embodiments of the present application may implement all the method steps implemented by the above-mentioned method embodiments, and may achieve the same effect. The same parts and beneficial effects as the same method embodiments are not repeated here.

The non-transient computer-readable storage medium may be any available medium or data storage device that may be accessed by the computer, including but not limited to, a magnetic storage (e.g., a floppy disk, a hard disk, a magnetic tape, a magneto-optical disk (MO), etc.), optical memory (such as CD, DVD, BD, HVD, etc.), and a semi-conductor memory (such as ROM, EPROM, EEPROM, non-volatile memory (NAND FLASH), solid-state drive (SSD)), etc.

Embodiments of the present application may be provided as methods, systems, or computer program products. Therefore, the present application may take the form of a complete hardware embodiment, a complete software embodiment, or an embodiment combining software and hardware. Furthermore, the present application may take the form of computer program products implemented on one or more computer available storage medium (including but not limited to a disk memory, an optical memory, etc.) including computer available program codes.

The present application is described with reference to the flow chart and/or block diagram of the method, device (system), and computer program product according to the embodiment of the present application. It should be understood that each flow and/or block in the flow chart and/or block diagram and the combination of flow and/or block in the flow chart and/or block diagram may be realized by computer executable instructions. These computer executable instructions may be provided to the processors of general purpose computers, special purpose computers, embedded processors or other programmable data processing devices to generate a machine, and the instructions executed by the processors of computers or other programmable data processing devices generate devices for realizing the functions specified in one or more processes and/or one or more blocks of a flowchart.

These computer executable instructions may be stored in the computer readable memory that may guide the computer or other programmable data processing devices to operate in a specific way, and the instructions stored in the computer readable memory generate a manufacturing product including an instruction device, which implements the functions specified in one or more flows and/or one or more blocks of the flowchart.

These computer executable instructions may be loaded on a computer or other programmable data processing device to cause a series of operation steps to be performed on a computer or other programmable device to generate computer-implemented processing, and the instructions executed on a computer or other programmable device provide steps for implementing the functions specified in one or more flows and/or one or more blocks of the flowchart.

What is claimed is:

1. A method for cell handover, comprising:

performing cell measurement on multiple cells based on multiple channel state information reference signal (CSI-RS) resource sets corresponding to the multiple cells;

transmitting a measurement result corresponding to one or more cells among the multiple cells to a base station of a current cell, wherein the measurement result of one or more cells is used for making a cell handover decision; and transmitting a random access preamble sequence to a base station of a target cell to be handed over, wherein the multiple CSI-RS resource sets corresponding to the multiple cells comprise a CSI-RS resource set corresponding to the target cell;

wherein each CSI-RS resource set corresponds to one cell, each CSI-RS resource set is associated with one CSI reporting configuration, and one or more CSI reporting configurations correspond to one CSI reporting state; or each CSI-RS resource in the CSI-RS resource set corresponds to one cell, and each CSI-RS resource set is associated with one CSI reporting configuration.

2. The method of claim 1, wherein the performing cell measurement on multiple cells based on CSI-RS resource sets corresponding to the multiple cells comprises:

performing, based on an indicator in the CSI reporting configuration, at least one of layer 1 reference signal receiving power (L1-RSRP) measurement, spatial-filtered L1-RSRP measurement, layer 3 reference signal receiving power (L3-RSRP) measurement, or spatial-filtered L3-RSRP measurement on CSI-RS resource sets corresponding to each CSI reporting configuration.

3. The method of claim 2, wherein the performing L1-RSRP measurement on CSI-RS resource sets corresponding to each CSI reporting configuration comprises:

performing the L1-RSRP measurement on each CSI-RS resource among the CSI-RS resource sets corresponding to each CSI reporting configuration, to obtain an L1-RSRP measurement value for each CSI-RS resource; and determining a measurement result corresponding to each CSI reporting configuration based on the L1-RSRP measurement value for each CSI-RS resource.

4. The method of claim 2, wherein the performing spatial-filtered L1-RSRP measurement on CSI-RS resource sets corresponding to each CSI reporting configuration comprises:

performing the L1-RSRP measurement on each CSI-RS resource among the CSI-RS resource sets corresponding to each CSI reporting configuration, and averaging all L1-RSRP measurement results to obtain a measurement result corresponding to each CSI reporting configuration.

5. The method of claim 2, wherein the performing L3-RSRP measurement on CSI-RS resource sets corresponding to each CSI reporting configuration comprises:

performing the L3-RSRP measurement on each CSI-RS resource among the CSI-RS resource sets corresponding to each CSI reporting configuration, to obtain an L3-RSRP measurement value for each CSI-RS resource; and determining a measurement result corresponding to each CSI reporting configuration based on the L3-RSRP measurement value for each CSI-RS resource; or wherein the performing spatial-filtered L3-RSRP measurement on CSI-RS resource sets corresponding to each CSI reporting configuration comprises:

performing the L3-RSRP measurement on each CSI-RS resource among the CSI-RS resource sets corresponding to each CSI reporting configuration, and averaging all L3-RSRP measurement results to obtain a measurement result corresponding to each CSI reporting configuration.

6. The method of claim 1, wherein each CSI-RS resource set is configured with cell IDs corresponding to the one or more cells;

wherein the measurement result corresponding to one or more cells comprises at least one of the following items: cell ID of the one or more cells, set indexes of CSI-RS resource sets corresponding to the one or more cells, an optimal measurement value and resource indexes of CSI-RS resources in the CSI-RS resource sets corresponding to the one or more cells, or precoding matrix indicators (PMIs) of the CSI-RS resource sets corresponding to the one or more cells.

7. The method of claim 1, wherein the transmitting the measurement result corresponding to one or more cells among the multiple cells to the base station of the current cell comprises:

transmitting the measurement result corresponding to one or more cells among the multiple cells to the base station of the current cell based on a measurement result reporting configuration of the base station of the current cell and/or based on a predefined rule.

8. The method of claim 7, wherein the predefined rule comprises that a neighbor cell has a measurement result better than a measurement result corresponding to the current cell, or the number of times that measurement result corresponding to any neighbor cell is better than the measurement result corresponding to the current cell is greater than a preset threshold.

9. The method of claim 7, wherein the transmitting the measurement result corresponding to one or more cells among the multiple cells to the base station of the current cell comprises:

transmitting an optimal measurement result among measurement results of the multiple cells to the base station of the current cell.

10. The method of claim 7, wherein the transmitting the measurement result corresponding to one or more cells among the multiple cells to the base station of the current cell based on the predefined rule comprises:

transmitting the measurement result corresponding to one or more cells to the base station of the current cell through a random access resource or an uplink resource request in case that the predefined rule is met.

11. The method of claim 1, wherein after the transmitting the measurement result corresponding to one or more cells among the multiple cells to the base station of the current cell, the method further comprises:

receiving random access response (RAR) message fed back based on the random access preamble sequence by the base station of the target cell;

wherein after the receiving RAR message fed back based on the random access preamble sequence by the base station of the target cell, the method further comprises:

in case that the RAR message comprises timing advance (TA) information, accessing the target cell based on the TA information in the RAR message.

12. The method of claim 1, further comprising:

receiving timing advance (TA) information or TA adjustment information transmitted by the base station of the current cell, wherein the TA information and the TA adjustment information are used for a user equipment (UE) to access a target cell.

13. A method for cell handover, comprising:

receiving a measurement result corresponding to one or more cells transmitted by a user equipment (UE), wherein the measurement result corresponding to one or more cells is obtained by performing, by the UE, cell measurement on multiple cells based on multiple channel state information reference signal (CSI-RS) resource sets corresponding to the multiple cells;

making a cell handover decision based on the measurement result corresponding to one or more cells; and receiving a random access preamble sequence sent from the UE to a target cell to be handed over, wherein the multiple CSI-RS resource sets corresponding to the multiple cells comprise a CSI-RS resource set corresponding to the target cell;

wherein each CSI-RS resource set corresponds to one cell, each CSI-RS resource set is associated with one CSI reporting configuration, and one or more CSI reporting configurations correspond to one CSI reporting state; or each CSI-RS resource in the CSI-RS resource set corresponds to one cell, and each CSI-RS resource set is associated with one CSI reporting configuration.

14. The method of claim 13, wherein before the receiving the measurement result corresponding to one or more cells transmitted by the UE, the method further comprises:

transmitting resource set configuration information to the UE, wherein the resource set configuration information comprises configuration information of CSI-RS resource sets, and configuration information of each CSI-RS resource set comprises a cell ID of a cell, and the number of the CSI-RS resource sets is equal to the number of the cells.

15. The method of claim 14, wherein the measurement result corresponding to one or more cells comprises at least one of the following items: cell ID of the one or more cells, set indexes of CSI-RS resource sets corresponding to the one or more cells, an optimal measurement value and indexes of CSI-RS resources in the CSI-RS resource sets corresponding to the one or more cells, or precoding matrix indicators (PMIs) of one or more CSI-RS resource in the CSI-RS resource sets corresponding to the one or more cells.

16. The method of claim 15, wherein the optimal measurement value is an optimal value among all layer 1 reference signal receiving power (L1-RSRP) measurement values corresponding to all CSI-RS resources among a CSI-RS resource set.

17. The method of claim 13, wherein the measurement result corresponding to one or more cells is transmitted by the UE based on a measurement result reporting configuration of a base station of a current cell and/or based on a predefined rule;

wherein the predefined rule comprises that a neighbor cell has a measurement result better than a measurement result corresponding to the current cell, or the number of times that measurement result corresponding to any neighbor cell is better than the measurement result corresponding to the current cell is greater than a preset threshold.

18. A user equipment (UE), comprising:

a processor, a memory storing a computer program, wherein the computer program, when executed by the processor, causes the user equipment to perform the following operations:

performing cell measurement on multiple cells based on multiple channel state information reference signal (CSI-RS) resource sets corresponding to the multiple cells;

transmitting a measurement result corresponding to one or more cells among the multiple cells to a base station of a current cell, wherein the measurement result of one or more cells is used for making a cell handover decision; and transmitting a random access preamble sequence to a base station of a target cell to be handed over, wherein the multiple CSI-RS resource sets corresponding to the multiple cells comprise a CSI-RS resource set corresponding to the target cell;

wherein each CSI-RS resource set corresponds to one cell, each CSI-RS resource set is associated with one CSI reporting configuration, and one or more CSI reporting configurations correspond to one CSI reporting state; or each CSI-RS resource in the CSI-RS resource set corresponds to one cell, and each CSI-RS resource set is associated with one CSI reporting configuration.

19. A base station, comprising:

a processor, a memory storing a computer program, wherein the computer program, when executed by the processor, causes the base station to perform the following operations:

receiving a measurement result corresponding to one or more cells transmitted by a user equipment (UE), wherein the measurement result corresponding to one or more cells is obtained by performing, by the UE, cell measurement on multiple cells based on multiple channel state information reference signal (CSI-RS) resource sets corresponding to the multiple cells;

making a cell handover decision based on the measurement result corresponding to one or more cells; and receiving a random access preamble sequence sent from the UE to a target cell to be handed over, wherein the multiple CSI-RS resource sets corresponding to the multiple cells comprise a CSI-RS resource set corresponding to the target cell;

wherein each CSI-RS resource set corresponds to one cell, each CSI-RS resource set is associated with one CSI reporting configuration, and one or more CSI reporting configurations correspond to one CSI reporting state; or each CSI-RS resource in the CSI-RS resource set corresponds to one cell, and each CSI-RS resource set is associated with one CSI reporting configuration.

\* \* \* \* \*